(12) United States Patent
Mercado et al.

(10) Patent No.: US 11,466,176 B2
(45) Date of Patent: Oct. 11, 2022

(54) NON-ASPHALTIC COATINGS, NON-ASPHALTIC ROOFING MATERIALS, AND METHODS OF MAKING THE SAME

(71) Applicant: BUILDING MATERIALS INVESTMENT CORPORATION, Dallas, TX (US)

(72) Inventors: Ramil Marcelo L. Mercado, Dallas, TX (US); Daniel E. Boss, Dallas, TX (US); Kevin Carr, Dallas, TX (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 17/400,827

(22) Filed: Aug. 12, 2021

(65) Prior Publication Data

US 2022/0049124 A1 Feb. 17, 2022

Related U.S. Application Data

(60) Provisional application No. 63/121,447, filed on Dec. 4, 2020, provisional application No. 63/065,763, filed on Aug. 14, 2020.

(51) Int. Cl.
  *C09D 191/00* (2006.01)
  *E04D 1/20* (2006.01)
(52) U.S. Cl.
  CPC ............. *C09D 191/00* (2013.01); *E04D 1/20* (2013.01)
(58) Field of Classification Search
  None
  See application file for complete search history.

(56) References Cited

U.S. PATENT DOCUMENTS

| | | | |
|---|---|---|---|
| 4,337,193 A | 6/1982 | Szita |
| 4,437,896 A | 3/1984 | Partanen |
| 5,221,703 A | 6/1993 | Ostermeyer |
| 7,811,373 B2 | 10/2010 | Partanen et al. |
| 7,994,244 B2 | 8/2011 | Binkley |
| 8,404,037 B2 | 3/2013 | Naidoo et al. |
| 8,572,921 B2 | 11/2013 | Ward et al. |
| 8,608,845 B2 | 12/2013 | Naidoo et al. |
| 8,629,199 B2 | 1/2014 | Guiselin et al. |
| 8,652,246 B2 | 2/2014 | Antoine et al. |
| 8,702,857 B2 | 4/2014 | Venema et al. |
| 8,713,882 B2 | 5/2014 | Kalkanoglu et al. |
| 8,741,171 B2 | 6/2014 | Swift et al. |

(Continued)

FOREIGN PATENT DOCUMENTS

| | | |
|---|---|---|
| EP | 0739321 A1 | 10/1996 |
| EP | 2192158 A1 | 6/2010 |

(Continued)

OTHER PUBLICATIONS

P. Ahmedzade, et al., "Laboratory investigation of the properties of asphalt concrete mixtures modified with TOP-SBS", Construction and Building Materials 21 (2007) 626-633.

(Continued)

*Primary Examiner* — Colin W. Slifka
(74) *Attorney, Agent, or Firm* — Venable LLP

(57) ABSTRACT

Non-asphaltic coatings for roofing materials, roofing materials made therefrom and methods of preparing such coatings and roofing materials utilize a combination of a crude tall oil-based continuous phase material, a resinous hardening agent, and a polymer.

6 Claims, 2 Drawing Sheets

(56) References Cited

U.S. PATENT DOCUMENTS

| | | |
|---|---|---|
| 9,133,334 B2 | 9/2015 | Tutin et al. |
| 9,469,784 B2 | 10/2016 | Aerts et al. |
| 9,505,963 B2 | 11/2016 | Aerts et al. |
| 10,030,145 B2 | 7/2018 | Severance et al. |
| 10,435,537 B2 | 10/2019 | Bindschedler et al. |
| 10,435,586 B2 | 10/2019 | Schaapman et al. |
| 2003/0175449 A1 | 9/2003 | Edson |
| 2005/0136278 A1 | 6/2005 | Hutter et al. |
| 2005/0186352 A1 | 8/2005 | Hutter et al. |
| 2007/0266562 A1 | 11/2007 | Friedman et al. |
| 2008/0038470 A1 | 2/2008 | Hagens et al. |
| 2010/0147190 A1 | 6/2010 | Naidoo et al. |
| 2010/0227954 A1 | 9/2010 | Naidoo et al. |
| 2011/0297285 A1 | 12/2011 | Pille-Wolf et al. |
| 2012/0071597 A1* | 3/2012 | Aerts .................. C09J 193/04 524/274 |
| 2016/0304718 A1 | 10/2016 | Bindschedler et al. |
| 2017/0190619 A1 | 7/2017 | Crews |
| 2018/0215919 A1 | 8/2018 | Reinke et al. |
| 2020/0224419 A1 | 7/2020 | Boss et al. |

FOREIGN PATENT DOCUMENTS

| | | |
|---|---|---|
| WO | 95/17469 A1 | 6/1995 |
| WO | 2012/033490 A1 | 3/2012 |
| WO | 2016/109206 A2 | 7/2016 |

OTHER PUBLICATIONS

P. Tang, et al., "Investigation of rheological properties of light colored synthetic asphalt binders containing different polymer modifiers". Construction and Building Materials 161 (2018) 175-185.

Written Opinion and International Search Report dated Oct. 14, 2021, in corresponding PCT/US21/45794 (14 pages).

* cited by examiner

NON-ASPHALTIC COATINGS, NON-ASPHALTIC ROOFING MATERIALS, AND METHODS OF MAKING THE SAME

RELATED APPLICATIONS

This application claims the priority of U.S. provisional application No. 63/065,763, filed Aug. 14, 2020, and U.S. provisional application No. 63/121,447, filed Dec. 4, 2020, which are incorporated herein by reference in their entirety for all purposes.

BACKGROUND OF THE INVENTION

This disclosure relates to non-asphaltic coatings for roofing materials, to roofing materials made therefrom and to methods of preparing such coatings and roofing materials. A combination of a crude tall oil-based continuous phase material, a resinous hardening agent, and a polymer is used in the non-asphaltic coatings. Roofing materials, such as, e.g., shingles, using these coatings or made by these methods have comparable or superior properties to roofing materials having a traditional asphaltic coating.

Traditional roofing materials, such as, e.g., shingles, are based upon a glass or felt mat that is coated and impregnated with an asphalt-based composition, e.g., an oxidized asphalt or polymer-modified asphalt (PMA), that is subsequently coated with granules.

SUMMARY OF THE INVENTION

An embodiment of the disclosure relates to a filled coating formulation comprising:
  5-40 wt % of a crude tall oil-based continuous phase material;
  3-35 wt % of a resinous hardening agent;
  1-10 wt % of a polymer; and
  a filler;
  wherein a viscosity of the filled coating formulation ranges from 2000-20000 cP measured at 400° F.

In an embodiment, the crude tall oil-based continuous phase material comprises tall oil pitch, tall oil pitch blends, distilled tall oil, tall oil pitch blends with low sterols, crude tall oil, or a combination thereof.

In an embodiment, the resinous hardening agent comprises esters of maleated rosin with pentaerythritol or stabilized pentaerythritol ester of rosin-based tackifier; rosin, maleated, polymer with glycerol; resin acids and rosin acids, esters with pentaerythritol; modified rosin ester; pentaerythritol ester of rosin; alpha methyl styrene tall oil resin; or a combination thereof.

In an embodiment, the polymer comprises poly(styrene-butadiene-styrene) (SBS), poly(styrene-ethylenebutylene-styrene) (SEBS), ethylene-vinyl acetate copolymer (EVA), polyvinyl butyral (PVB), or a combination thereof.

In an embodiment, the filler comprises calcium carbonate, barium sulfate, calcium sulfate, talc, limestone, perlite, silica, fumed silica, precipitated silica, quartz, aluminum trihydrate, magnesium hydroxide, colemanite, titanium dioxide, fly ash, graphene nanoparticles, carbon black, recycled rubber tires, recycled shingles, recycled thermoplastic resins, basalt, roofing granules, clay, lignin, or a combination thereof.

In an embodiment, the filled coating formulation further comprises a dye, a pigment, a fire retardant, a UV stabilizer, or a combination thereof.

In an embodiment, the filled coating formulation comprises 40-75 wt % of filler.

An embodiment of the disclosure relates to a non-asphaltic roofing shingle comprising a substrate having a coating which comprises a crude tall oil-based continuous phase material, a resinous hardening agent, a polymer, and a filler, wherein the softening point of the coating ranges from 175-320° F., and wherein the penetration of the coating ranges from 5-100 dmm measured at 77° F.

In an embodiment, the substrate comprises a fiberglass mat, a polyester mat, a scrim, a coated scrim, or a combination thereof.

In an embodiment, the non-asphaltic roofing shingle is configured to be prepared on a substantially standard manufacturing line for asphaltic shingles at a standard speed.

In an embodiment, the non-asphaltic roofing shingle is a single layer shingle or a laminated shingle having two or more layers.

In an embodiment, a thickness of the coating on the substrate ranges from 5-100 mils.

In an embodiment, the non-asphaltic roofing shingle comprises one or more layers of the coating.

In an embodiment, the non-asphaltic roofing shingle further comprises granules.

An embodiment of the disclosure relates to a method comprising:
  obtaining a substrate; and
  coating the substrate with a filled coating formulation to form a non-asphaltic roofing material,
  wherein the filled coating formulation comprises 5-40 wt % of a crude tall oil-based continuous phase material, 3-35 wt % of a resinous hardening agent, 1-10 wt % of a polymer, and a filler,
  wherein a viscosity of the filled coating formulation ranges from 2000-20000 cP measured at 400° F.

In an embodiment, coating the substrate is performed on a substantially standard manufacturing line for asphaltic shingles at a standard speed.

In an embodiment, the method further comprises applying granules to the non-asphaltic roofing material.

In an embodiment, the method further comprises applying one or more layers of the coating to form the non-asphaltic roofing material.

In an embodiment, the method further comprises preparing the coating.

In an embodiment, the method further comprises cutting the formed non-asphaltic roofing material to provide one or more roofing shingle layers and configuring the one or more roofing shingle layers to provide a shingle having a desired structure.

In an embodiment of the method, the filled coating formulation comprises 40-75 wt % of filler.

An embodiment of the disclosure relates to a non-filled coating formulation comprising:
  20-60 wt % of a plant- or bio-derived continuous phase material;
  30-75 wt % of a resinous hardening agent; and
  5-20 wt % of a polymer,
  wherein a viscosity of the non-filled coating formulation ranges from 200-12,500 cP measured at 400° F.

In an embodiment, the plant- or bio-derived continuous phase material comprises corn oil, vegetable oil, triglycerides, or a combination thereof.

BRIEF DESCRIPTION OF THE FIGURES

For a more complete understanding of the invention and the advantages thereof, reference is made to the following descriptions, taken in conjunction with the accompanying figures, in which.

DETAILED DESCRIPTION

Figure 1:
FIGS. 1 and 2 are photographs of the front and back surfaces, respectively, of coupons of a filled coating formulation according to an embodiment of the disclosure.

The present disclosure provides non-asphaltic coatings for roofing materials, roofing materials made therefrom and methods of preparing such coatings and roofing materials. The disclosure utilizes a combination of a crude tall oil-based continuous phase material, a resinous hardening agent, and a polymer. This combination can be used with existing equipment for the manufacture of shingles and similar roofing material with minimal process changes. In addition, to a significant extent, the materials employed herein are biologically derived and are by-products of the paper-making process.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure are intended to be illustrative, and not restrictive.

Throughout the specification, the following terms take the meanings explicitly associated herein, unless the context clearly dictates otherwise. The phrases "in one embodiment", "in an embodiment", and "in some embodiments" as used herein do not necessarily refer to the same embodiment(s), though they may. Furthermore, the phrases "in another embodiment" and "in some other embodiments" as used herein do not necessarily refer to a different embodiment, although they may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a", "an", and "the" include plural references. The meaning of "in" includes "in" and "on".

As used herein, terms such as "comprising", "including," and "having" do not limit the scope of a specific embodiment to the materials or steps recited by the embodiment.

All prior patents, publications, and test methods referenced herein are incorporated by reference in their entireties.

As used herein, the term "free of asphalt" means that the coating does not include any amount of asphalt. In other words, the coating includes 0% by weight of asphalt.

As used herein, the terms "composite" and "coated substrate" are used interchangeably.

As used herein, the term "weight percent" means the percentage by weight of a component based upon a total weight of the filled coating formulation, composite or coated substrate, as applicable.

One embodiment of the disclosure provides a filled coating formulation comprising:

5-40 wt % of a crude tall oil-based continuous phase material;
3-35 wt % of a resinous hardening agent;
1-10 wt % of a polymer; and
a filler,
wherein a viscosity of the filled coating formulation ranges from 2000-20000 cP measured at 400° F.

Non-limiting examples of crude tall oil-based continuous phase materials used in the present disclosure include, without limitation, tall oil pitch, tall oil pitch blends, distilled tall oil, tall oil pitch blends with low sterols, crude tall oil, and combinations thereof. One of ordinary skill in the art will readily understand what is meant by "low sterols" with regard to tall oil pitch blends with low sterols; for example, "low sterols" may indicate that some amount of sterols has been removed from a given tall oil pitch blend. In an embodiment, the crude tall oil-based continuous phase material is Sylfat DP-1 (Kraton Chemical LLC), Sylfat DP-8 (Kraton Chemical LLC), Dertoline Poix de Tall Oil (Les Derives Resiniques et Terpeniques (DRT)), Altapyne pitch (Ingevity Corporation), Tufftrek 3100 (Georgia Pacific Chemicals), or any combination thereof. As used herein, "crude tall oil-based continuous phase material(s)" refers to any material used or obtained during the distillation of crude tall oil (CTO) including crude tall oil and tall oil pitch (TOP), which is the residue obtained from the distillation of crude tall oil; for purposes of the present disclosure, "crude tall oil-based continuous phase material(s)" also includes materials derived from any material used or obtained during the distillation of crude tall oil. TOP is a dark, tar-like soft solid at room temperature.

In an embodiment, the filled coating formulation comprises 5-40 wt % of crude tall oil-based continuous phase material. In an embodiment, the filled coating formulation comprises 5-35 wt % of crude tall oil-based continuous phase material. In an embodiment, the filled coating formulation comprises 5-30 wt % of crude tall oil-based continuous phase material. In an embodiment, the filled coating formulation comprises 5-25 wt % of crude tall oil-based continuous phase material. In an embodiment, the filled coating formulation comprises 5-20 wt % of crude tall oil-based continuous phase material. In an embodiment, the filled coating formulation comprises 5-15 wt % of crude tall oil-based continuous phase material. In an embodiment, the filled coating formulation comprises 5-10 wt % of crude tall oil-based continuous phase material. In an embodiment, the filled coating formulation comprises 10-40 wt % of crude tall oil-based continuous phase material. In an embodiment, the filled coating formulation comprises 10-35 wt % of crude tall oil-based continuous phase material. In an embodiment, the filled coating formulation comprises 10-30 wt % of crude tall oil-based continuous phase material. In an embodiment, the filled coating formulation comprises 10-25 wt % of crude tall oil-based continuous phase material. In an embodiment, the filled coating formulation comprises 10-20 wt % of crude tall oil-based continuous phase material. In an embodiment, the filled coating formulation comprises 10-15 wt % of crude tall oil-based continuous phase material. In an embodiment, the filled coating formulation comprises 15-40 wt % of crude tall oil-based continuous phase material. In an embodiment, the filled coating formulation comprises 15-35 wt % of crude tall oil-based continuous phase material. In an embodiment, the filled coating formulation comprises 15-30 wt % of crude tall oil-based continuous phase material. In an embodiment, the filled coating formulation comprises 15-25 wt % of crude tall oil-based continuous phase material. In an embodiment, the filled coating formulation comprises 15-20 wt % of crude tall oil-based continuous phase material. In an embodiment, the filled coating formulation comprises 20-40 wt % of crude tall oil-based continuous phase material. In an embodiment, the filled coating formulation comprises 20-35 wt % of crude tall oil-based continuous phase material. In an embodiment, the filled coating formulation comprises 20-30 wt % of crude tall oil-based continuous phase material. In an embodiment, the filled coating formulation comprises 20-25 wt % of crude tall oil-based continuous phase material. In an embodiment, the filled coating formulation comprises 25-40 wt % of crude tall oil-based continuous phase material. In an embodiment, the filled coating formulation comprises 25-35 wt % of crude tall oil-based continuous phase material. In an embodiment, the filled coating formulation comprises 25-30 wt % of crude tall oil-based continuous phase material. In an embodiment, the filled coating formulation comprises 30-40 wt % of crude tall oil-based continuous phase material. In an embodiment, the filled coating formulation comprises 30-35 wt % of crude tall oil-based continuous phase material. In an embodiment, the filled coating formulation comprises 35-40 wt % of crude tall oil-based continuous phase material.

Non-limiting examples of resinous hardening agents used in embodiments of the present disclosure include, without limitation, esters of maleated rosin with pentaerythritol or stabilized pentaerythritol ester of rosin-based tackifier; rosin, maleated, polymer with glycerol; resin acids and rosin acids, esters with pentaerythritol; modified rosin ester; pentaerythritol ester of rosin; alpha methyl styrene tall oil resin; and any combination thereof. In an embodiment, the resinous hardening agent is Dertoline P-110 (Les Derives Resiniques et Terpeniques (DRT)), Sylvacote 7097 (Kraton Chemical LLC), Sylvatac RE-98 (Kraton Chemical LLC), WestRez 5110 (Ingevity Corporation), Sylvacote 4984 (Kraton Chemical LLC), Dertoline P-105 (Les Derives Resiniques et Terpeniques (DRT)), Sylvares 115, or any combination thereof. As used herein, "resinous hardening agent(s)" refers to any material composing the rosin fraction obtained during distillation of crude tall oil, e.g., rosin acids, resin acids, etc.; for purposes of the present disclosure, "resinous hardening agent(s)" also includes materials derived from any material composing the rosin fraction obtained during distillation of crude tall oil, e.g., derived by esterification. According to embodiments of this disclosure, a resinous hardening agent having a softening point ranging from 80° C.-140° C. is useful or a resinous hardening agent having a softening point ranging from 80° C.-135° C. is useful. According to embodiments of this disclosure, a resinous hardening agent is used in combination with a crude tall oil-based continuous phase material to raise the softening point thereof to a level that makes the crude tall oil-based continuous phase material suitable for use in a roofing material. It is further believed that the use of a resinous hardening agent herein changes the resistance to deformation of a resulting product, e.g., prevents granules from moving on a roofing shingle.

In an embodiment, the filled coating formulation comprises 3-35 wt % of resinous hardening agent. In an embodiment, the filled coating formulation comprises 3-30 wt % of resinous hardening agent. In an embodiment, the filled coating formulation comprises 3-25 wt % of resinous hardening agent. In an embodiment, the filled coating formulation comprises 3-20 wt % of resinous hardening agent. In an embodiment, the filled coating formulation comprises 3-15 wt % of resinous hardening agent. In an embodiment, the filled coating formulation comprises 3-10 wt % of resinous hardening agent. In an embodiment, the filled coating formulation comprises 3-5 wt % of resinous hardening agent. In an embodiment, the filled coating formulation comprises 5-35 wt % of resinous hardening agent. In an embodiment, the filled coating formulation comprises 5-30 wt % of resinous hardening agent. In an embodiment, the filled coating formulation comprises 5-25 wt % of resinous hardening agent. In an embodiment, the filled coating formulation comprises 5-20 wt % of resinous hardening agent. In an embodiment, the filled coating formulation comprises 5-15 wt % of resinous hardening agent. In an embodiment, the filled coating formulation comprises 5-10 wt % of resinous hardening agent. In an embodiment, the filled coating formulation comprises 10-35 wt % of resinous hardening agent. In an embodiment, the filled coating formulation comprises 10-30 wt % of resinous hardening agent. In an embodiment, the filled coating formulation comprises 10-25 wt % of resinous hardening agent. In an embodiment, the filled coating formulation comprises 10-20 wt % of resinous hardening agent. In an embodiment, the filled coating formulation comprises 10-15 wt % of resinous hardening agent. In an embodiment, the filled coating formulation comprises 15-35 wt % of resinous hardening agent. In an embodiment, the filled coating formulation comprises 15-30 wt % of resinous hardening agent. In an embodiment, the filled coating formulation comprises 15-25 wt % of resinous hardening agent. In an embodiment, the filled coating formulation comprises 15-20 wt % of resinous hardening agent. In an embodiment, the filled coating formulation comprises 20-35 wt % of resinous hardening agent. In an embodiment, the filled coating formulation comprises 20-30 wt % of resinous hardening agent. In an embodiment, the filled coating formulation comprises 20-25 wt % of resinous hardening agent. In an embodiment, the filled coating formulation comprises 25-35 wt % of resinous hardening agent. In an embodiment, the filled coating formulation comprises 25-30 wt % of resinous hardening agent. In an embodiment, the filled coating formulation comprises 30-35 wt % of resinous hardening agent.

In an embodiment, the filled coating formulation comprises an amount of resinous hardening agent sufficient to achieve a viscosity ranging from 2000-20000 cP measured at 400° F. In an embodiment, the filled coating formulation comprises an amount of resinous hardening agent sufficient to achieve a viscosity ranging from 2000-15000 cP measured at 400° F. In an embodiment, the filled coating formulation comprises an amount of resinous hardening agent sufficient to achieve a viscosity ranging from 2000-10000 cP measured at 400° F. In an embodiment, the filled coating formulation comprises an amount of resinous hardening agent sufficient to achieve a viscosity ranging from 2000-5000 cP measured at 400° F. In an embodiment, the filled coating formulation comprises an amount of resinous hardening agent sufficient to achieve a viscosity ranging from 5000-20000 cP measured at 400° F. In an embodiment, the filled coating formulation comprises an amount of resinous hardening agent sufficient to achieve a viscosity ranging from 5000-15000 cP measured at 400° F. In an embodiment, the filled coating formulation comprises an amount of resinous hardening agent sufficient to achieve a viscosity ranging from 5000-10000 cP measured at 400° F. In an embodiment, the filled coating formulation comprises an amount of resinous hardening agent sufficient to achieve a viscosity ranging from 10000-20000 cP measured at 400° F. In an embodiment, the filled coating formulation comprises an amount of resinous hardening agent sufficient to achieve a viscosity ranging from 10000-15000 cP measured at 400° F. In an embodiment, the filled coating formulation comprises an amount of resinous hardening agent sufficient to achieve a viscosity ranging from 15000-20000 cP measured at 400° F.

Non-limiting examples of polymers used in embodiments of the present disclosure include, without limitation, poly(styrene-butadiene-styrene) (SBS), poly(styrene-ethylen-ebutylene-styrene) (SEBS), ethylene-vinyl acetate copolymer (EVA), polyvinyl butyral (PVB), polystyrene, and any combination thereof. In embodiments, the polymer is branched SBS block copolymer, 30% styrene; radial SBS block copolymer, 32% styrene; linear SEBS block copolymer, 29% styrene; ethylene-vinyl acetate copolymer, 28% vinyl acetate; or any combination thereof. In embodiments, the polymer is D-1184 (Kraton Polymers), D-1189 (Kraton Polymers), D-1191 (Kraton Polymers), G-1650 (Kraton Polymers), Elvax 240W (Dow), or any combination thereof. According to embodiments of this disclosure, a polymer is used in combination with a crude tall oil-based continuous phase material and a resinous hardening agent to further increase the softening point of the combination thereof and to reduce brittleness such that the three-way combination is suitable for use in a roofing material.

In an embodiment, a combination of polymers is used. In an embodiment, a combination of SBS and SEBS is used. In some embodiments, the ratio of SBS to SEBS is 1:1 to 10:1 In other embodiments, the ratio of SBS to SEBS is 1:1 to 8:1. In other embodiments, the ratio of SBS to SEBS is 1:1 to 6:1. In other embodiments, the ratio of SBS to SEBS is 1:1 to 4:1. In other embodiments, the ratio of SBS to SEBS is 1:1 to 2:1. In other embodiments, the ratio of SBS to SEBS is 2:1 to 10:1. In other embodiments, the ratio of SBS to SEBS is 2:1 to 8:1. In other embodiments, the ratio of SBS to SEBS is 2:1 to 6:1. In other embodiments, the ratio of SBS to SEBS is 2:1 to 4:1. In other embodiments, the ratio of SBS to SEBS is 4:1 to 10:1. In other embodiments, the ratio of SBS to SEBS is 4:1 to 8:1. In other embodiments, the ratio of SBS to SEBS is 4:1 to 6:1. In other embodiments, the ratio of SBS to SEBS is 6:1 to 10:1. In other embodiments, the ratio of SBS to SEBS is 6:1 to 8:1. In other embodiments, the ratio of SBS to SEBS is 8:1 to 10:1. In other embodiments, the ratio of SBS to SEBS is 5:1.

In an embodiment, the filled coating formulation comprises 1-10 wt % of polymer. In an embodiment, the filled coating formulation comprises 1-8 wt % of polymer. In an embodiment, the filled coating formulation comprises 1-6 wt % of polymer. In an embodiment, the filled coating formulation comprises 1-4 wt % of polymer. In an embodiment, the filled coating formulation comprises 1-2 wt % of polymer. In an embodiment, the filled coating formulation comprises 2-10 wt % of polymer. In an embodiment, the filled coating formulation comprises 2-8 wt % of polymer. In an embodiment, the filled coating formulation comprises 2-6 wt % of polymer. In an embodiment, the filled coating formulation comprises 2-4 wt % of polymer. In an embodiment, the filled coating formulation comprises 4-10 wt % of polymer. In an embodiment, the filled coating formulation comprises 4-8 wt % of polymer. In an embodiment, the filled coating formulation comprises 4-6 wt % of polymer. In an embodiment, the filled coating formulation comprises 6-10 wt % of polymer. In an embodiment, the filled coating formulation comprises 6-8 wt % of polymer. In an embodiment, the filled coating formulation comprises 8-10 wt % of polymer.

In an embodiment, a ratio of polymer to crude tall oil-based continuous phase material and resinous hardening agent ranges from 0.01 to 1.25. In an embodiment, a ratio of polymer to crude tall oil-based continuous phase material and resinous hardening agent ranges from 0.01 to 1. In an embodiment, a ratio of polymer to crude tall oil-based continuous phase material and resinous hardening agent ranges from 0.01 to 0.75. In an embodiment, a ratio of polymer to crude tall oil-based continuous phase material and resinous hardening agent ranges from 0.01 to 0.5. In an embodiment, a ratio of polymer to crude tall oil-based continuous phase material and resinous hardening agent ranges from 0.01 to 0.25. In an embodiment, a ratio of polymer to crude tall oil-based continuous phase material and resinous hardening agent ranges from 0.01 to 0.12. In an embodiment, a ratio of polymer to crude tall oil-based continuous phase material and resinous hardening agent ranges from 0.01 to 0.06. In an embodiment, a ratio of polymer to crude tall oil-based continuous phase material and resinous hardening agent ranges from 0.01 to 0.03. In an embodiment, a ratio of polymer to crude tall oil-based continuous phase material and resinous hardening agent ranges from 0.03 to 1.25. In an embodiment, a ratio of polymer to crude tall oil-based continuous phase material and resinous hardening agent ranges from 0.03 to 1. In an embodiment, a ratio of polymer to crude tall oil-based continuous phase material and resinous hardening agent ranges from 0.03 to 0.75. In an embodiment, a ratio of polymer to crude tall oil-based continuous phase material and resinous hardening agent ranges from 0.03 to 0.5. In an embodiment, a ratio of polymer to crude tall oil-based continuous phase material and resinous hardening agent ranges from 0.03 to 0.25. In an embodiment, a ratio of polymer to crude tall oil-based continuous phase material and resinous hardening agent ranges from 0.03 to 0.06. In an embodiment, a ratio of polymer to crude tall oil-based continuous phase material and resinous hardening agent ranges from 0.03 to 0.06. In an embodiment, a ratio of polymer to crude tall oil-based continuous phase material and resinous hardening agent ranges from 0.06 to 1.25. In an embodiment, a ratio of polymer to crude tall oil-based continuous phase material and resinous hardening agent ranges from 0.06 to 1. In an embodiment, a ratio of polymer to crude tall oil-based continuous phase material and resinous hardening agent ranges from 0.06 to 0.75. In an embodiment, a ratio of polymer to crude tall oil-based continuous phase material and resinous hardening agent ranges from 0.06 to 0.5. In an embodiment, a ratio of polymer to crude tall oil-based continuous phase material and resinous hardening agent ranges from 0.06 to 0.25. In an embodiment, a ratio of polymer to crude tall oil-based continuous phase material and resinous hardening agent ranges from 0.06 to 0.12. In an embodiment, a ratio of polymer to crude tall oil-based continuous phase material and resinous hardening agent ranges from 0.12 to 1.25. In an embodiment, a ratio of polymer to crude tall oil-based continuous phase material and resinous hardening agent ranges from 0.12 to 1. In an embodiment, a ratio of polymer to crude tall oil-based continuous phase material and resinous hardening agent ranges from 0.12 to 0.75. In an embodiment, a ratio of polymer to crude tall oil-based continuous phase material ranges from 0.12 to 0.5. In an embodiment, a ratio of polymer to crude tall oil-based continuous phase material and resinous hardening agent ranges from 0.12 to 0.25. In an embodiment, a ratio of polymer to crude tall oil-based continuous phase material and resinous hardening agent ranges from 0.25 to 1.25. In an embodiment, a ratio of polymer to crude tall oil-based continuous phase material and resinous hardening agent ranges from 0.25 to 1. In an embodiment, a ratio of polymer to crude tall oil-based continuous phase material and resinous hardening agent ranges from 0.25 to 0.75. In an embodiment, a ratio of polymer to crude tall oil-based continuous phase material and resinous hardening agent ranges from 0.25 to 0.5. In an embodiment, a ratio of polymer to crude tall oil-based continuous phase material and resinous hardening agent ranges from 0.5 to 1.25. In an embodiment, a ratio of polymer to crude tall oil-based continuous phase material and resinous hardening agent ranges from 0.5 to 1. In an embodiment, a ratio of polymer to crude tall oil-based continuous phase material and resinous hardening agent ranges from 0.5 to 0.75. In an embodiment, a ratio of polymer to crude tall oil-based continuous phase material and resinous hardening agent ranges from 0.75 to 1.25. In an embodiment, a ratio of polymer to crude tall oil-based continuous phase material and resinous hardening agent ranges from 0.75 to 1. In an embodiment, a ratio of polymer to crude tall oil-based continuous phase material and resinous hardening agent ranges from 1 to 1.25.

In an embodiment, a ratio of polymer to crude tall oil-based continuous phase material and resinous hardening agent ranges from 0.01 to 0.17. In an embodiment, a ratio of polymer to crude tall oil-based continuous phase material and resinous hardening agent ranges from 0.01 to 0.16. In an embodiment, a ratio of polymer to crude tall oil-based continuous phase material and resinous hardening agent ranges from 0.01 to 0.15. In an embodiment, a ratio of polymer to crude tall oil-based continuous phase material and resinous hardening agent ranges from 0.01 to 0.14. In an embodiment, a ratio of polymer to crude tall oil-based continuous phase material and resinous hardening agent ranges from 0.01 to 0.13. In an embodiment, a ratio of polymer to crude tall oil-based continuous phase material and resinous hardening agent ranges from 0.01 to 0.12. In an embodiment, a ratio of polymer to crude tall oil-based continuous phase material and resinous hardening agent ranges from 0.01 to 0.11. In an embodiment, a ratio of polymer to crude tall oil-based continuous phase material and resinous hardening agent ranges from 0.01 to 0.1. In an embodiment, a ratio of polymer to crude tall oil-based continuous phase material and resinous hardening agent ranges from 0.02 to 0.17. In an embodiment, a ratio of polymer to crude tall oil-based continuous phase material and resinous hardening agent ranges from 0.02 to 0.16. In an embodiment, a ratio of polymer to crude tall oil-based continuous phase material and resinous hardening agent ranges from 0.02 to 0.15. In an embodiment, a ratio of polymer to crude tall oil-based continuous phase material and resinous hardening agent ranges from 0.02 to 0.14. In an embodiment, a ratio of polymer to crude tall oil-based continuous phase material and resinous hardening agent ranges from 0.02 to 0.13. In an embodiment, a ratio of polymer to crude tall oil-based continuous phase material and resinous hardening agent ranges from 0.02 to 0.12. In an embodiment, a ratio of polymer to crude tall oil-based continuous phase material and resinous hardening agent ranges from 0.02 to 0.11. In an embodiment, a ratio of polymer to crude tall oil-based continuous phase material and resinous hardening agent ranges from 0.02 to 0.1. In an embodiment, a ratio of polymer to crude tall oil-based continuous phase material and resinous hardening agent ranges from 0.04 to 0.17. In an embodiment, a ratio of polymer to crude tall oil-based continuous phase material and resinous hardening agent ranges from 0.04 to 0.16. In an embodiment, a ratio of polymer to crude tall oil-based continuous phase material and resinous hardening agent ranges from 0.04 to 0.15. In an embodiment, a ratio of polymer to crude tall oil-based continuous phase material and resinous hardening agent ranges from 0.04 to 0.14. In an embodiment, a ratio of polymer to crude tall oil-based continuous phase material and resinous hardening agent ranges from 0.04 to 0.13. In an embodiment, a ratio of polymer to crude tall oil-based continuous phase material and resinous hardening agent ranges from 0.04 to 0.12. In an embodiment, a ratio of polymer to crude tall oil-based continuous phase material and resinous hardening agent ranges from 0.04 to 0.11. In an embodiment, a ratio of polymer to crude tall oil-based continuous phase material and resinous hardening agent ranges from 0.04 to 0.1. In an embodiment, a ratio of polymer to crude tall oil-based continuous phase material and resinous hardening agent ranges from 0.06 to 0.17. In an embodiment, a ratio of polymer to crude tall oil-based continuous phase material and resinous hardening agent ranges from 0.06 to 0.16. In an embodiment, a ratio of polymer to crude tall oil-based continuous phase material and resinous hardening agent ranges from 0.06 to 0.15. In an embodiment, a ratio of polymer to crude tall oil-based continuous phase material and resinous hardening agent ranges from 0.06 to 0.14. In an embodiment, a ratio of polymer to crude tall oil-based continuous phase material and resinous hardening agent ranges from 0.06 to 0.13. In an embodiment, a ratio of polymer to crude tall oil-based continuous phase material and resinous hardening agent ranges from 0.06 to 0.12. In an embodiment, a ratio of polymer to crude tall oil-based continuous phase material and resinous hardening agent ranges from 0.06 to 0.11. In an embodiment, a ratio of polymer to crude tall oil-based continuous phase material and resinous hardening agent ranges from 0.06 to 0.1. In an embodiment, a ratio of polymer to crude tall oil-based continuous phase material and resinous hardening agent ranges from 0.08 to 0.17. In an embodiment, a ratio of polymer to crude tall oil-based continuous phase material and resinous hardening agent ranges from 0.08 to 0.16. In an embodiment, a ratio of polymer to crude tall oil-based continuous phase material and resinous hardening agent ranges from 0.08 to 0.15. In an embodiment, a ratio of polymer to crude tall oil-based continuous phase material and resinous hardening agent ranges from 0.08 to 0.14. In an embodiment, a ratio of polymer to crude tall oil-based continuous phase material and resinous hardening agent ranges from 0.08 to 0.13. In an embodiment, a ratio of polymer to crude tall oil-based continuous phase material and resinous hardening agent ranges from 0.08 to 0.12. In an embodiment, a ratio of polymer to crude tall oil-based continuous phase material and resinous hardening agent ranges from 0.08 to 0.11. In an embodiment, a ratio of polymer to crude tall oil-based continuous phase material and resinous hardening agent ranges from 0.08 to 0.1. In an embodiment, a ratio of polymer to crude tall oil-based continuous phase material and resinous hardening agent is less than 0.18. In an embodiment, a ratio of polymer to crude tall oil-based continuous phase material and resinous hardening agent is less than 0.17. In an embodiment, a ratio of polymer to crude tall oil-based continuous phase material and resinous hardening agent is less than 0.16. In an embodiment, a ratio of polymer to crude tall oil-based continuous phase material and resinous hardening agent is less than 0.15. In an embodiment, a ratio of polymer to crude tall oil-based continuous phase material and resinous hardening agent is less than 0.14. In an embodiment, a ratio of polymer to crude tall oil-based continuous phase material and resinous hardening agent is less than 0.13. In an embodiment, a ratio of polymer to crude tall oil-based continuous phase material and resinous hardening agent is less than 0.12. In an embodiment, a ratio of polymer to crude tall oil-based continuous phase material and resinous hardening agent is less than 0.11. In an embodiment, a ratio of polymer to crude tall oil-based continuous phase material and resinous hardening agent is less than 0.1.

Non-limiting examples of fillers used in the present disclosure include, without limitation, an organic filler, an inorganic mineral filler, and any combination thereof. In an embodiment, the filler is calcium carbonate, barium sulfate, calcium sulfate, talc, limestone, perlite, silica, fumed silica, precipitated silica, quartz, aluminum trihydrate, magnesium hydroxide, colemanite (e.g., hydrated calcium borate), titanium dioxide, fly ash, graphene nanoparticles, carbon black, recycled rubber tires, recycled shingles, recycled thermoplastic resins, basalt, roofing granules, clay, lignin, or any combination thereof. In an embodiment, the filler includes a high aspect ratio filler such as, e.g., graphene nanoparticles or carbon black. In an embodiment, the filler is a recycled material, such as post-consumer recycled asphalt shingles (PCRAS), ground tire rubber (GTR), acrylonitrile rubber (NBR), acrylonitrile butadiene styrene rubber (ABS), or other recycled thermoplastic(s). A non-limiting example of GTR includes GTR available from Lehigh Technologies, Tucker, Ga.

In an embodiment, the filled coating formulation comprises a remainder of filler; in other words, the filled coating formulation comprises a crude tall oil-based continuous phase material, a resinous hardening agent, a polymer, and a filler in amounts such that the total wt % of the filled coating formulation is 100 wt %. In an embodiment, the filled coating formulation comprises 15-91 wt % of filler. In an embodiment, the filled coating formulation comprises 40-95 wt % of filler. In an embodiment, the filled coating formulation comprises 40-85 wt % of filler. In an embodiment, the filled coating formulation comprises 40-75 wt % of filler. In an embodiment, the filled coating formulation comprises 40-65 wt % of filler. In an embodiment, the filled coating formulation comprises 40-55 wt % of filler. In an embodiment, the filled coating formulation comprises 40-45 wt % of filler. In an embodiment, the filled coating formulation comprises 50-95 wt % of filler. In an embodiment, the filled coating formulation comprises 50-85 wt % of filler. In an embodiment, the filled coating formulation comprises 50-75 wt % of filler. In an embodiment, the filled coating formulation comprises 50-65 wt % of filler. In an embodiment, the filled coating formulation comprises 50-55 wt % of filler. In an embodiment, the filled coating formulation comprises 60-95 wt % of filler. In an embodiment, the filled coating formulation comprises 60-85 wt % of filler. In an embodiment, the filled coating formulation comprises 60-75 wt % of filler. In an embodiment, the filled coating formulation comprises 60-65 wt % of filler. In an embodiment, the filled coating formulation comprises 70-85 wt % of filler. In an embodiment, the filled coating formulation comprises 70-75 wt % of filler. In an embodiment, the filled coating formulation comprises 50 wt %, 60 wt %, 70 wt % or 80 wt % of filler.

Other components may also be added to the filled coating formulation to further modify or to provide additional properties, e.g., electrical conductivity. In an embodiment, the filled coating formulation further comprises a dye, a pigment, a fire retardant, a UV stabilizer, a tackifier, titanium dioxide, or any combination thereof. One of ordinary skill in the art would readily appreciate that such components could be included in a filled coating formulation in any amount suitable to achieve the purpose of its inclusion. Non-limiting examples of pigments and/or dyes include colorants, IR reflective pigments and/or dyes, and phosphorescence and/or fluorescence pigments and/or dyes. Non-limiting examples of pigments include, but are not limited to, color pigments and/or reflective pigments, such as Colonial Red, which is a reflective pigment that is available from Americhem Inc., Cuyahoga Falls, Ohio Non-limiting examples of UV stabilizers include, but are not limited to, UV absorbers, hindered amine light stabilizers, anti-oxidant pigments and/or carriers, such as PP, PE, or IPP.

In an embodiment, the coating does not comprise asphalt (i.e., is "free of asphalt"). In other words, the coating includes 0% by weight of asphalt. In an embodiment, the coating comprises 0.1% by weight to 49% by weight of asphalt. In an embodiment, the coating comprises 1% by weight to 35% by weight of asphalt. In an embodiment, the coating comprises 10% by weight to 25% by weight of asphalt.

In an embodiment, the filled coating formulation has a softening point ranging from 175-320° F. In an embodiment, the filled coating formulation has a softening point ranging from 175-300° F. In an embodiment, the filled coating formulation has a softening point ranging from 175-275° F. In an embodiment, the filled coating formulation has a softening point ranging from 175-250° F. In an embodiment, the filled coating formulation has a softening point ranging from 175-225° F. In an embodiment, the filled coating formulation has a softening point ranging from 175-200° F. In an embodiment, the filled coating formulation has a softening point ranging from 200-320° F. In an embodiment, the filled coating formulation has a softening point ranging from 200-300° F. In an embodiment, the filled coating formulation has a softening point ranging from 200-275° F. In an embodiment, the filled coating formulation has a softening point ranging from 200-250° F. In an embodiment, the filled coating formulation has a softening point ranging from 200-225° F. In an embodiment, the filled coating formulation has a softening point ranging from 225-320° F. In an embodiment, the filled coating formulation has a softening point ranging from 225-300° F. In an embodiment, the filled coating formulation has a softening point ranging from 225-275° F. In an embodiment, the filled coating formulation has a softening point ranging from 225-250° F. In an embodiment, the filled coating formulation has a softening point ranging from 250-320° F. In an embodiment, the filled coating formulation has a softening point ranging from 250-300° F. In an embodiment, the filled coating formulation has a softening point ranging from 250-275° F. In an embodiment, the filled coating formulation has a softening point ranging from 275-320° F. In an embodiment, the filled coating formulation has a softening point ranging from 275-300° F. In an embodiment, the filled coating formulation has a softening point ranging from 300-320° F.

In an embodiment, the filled coating formulation has a penetration ranging from 5-100 dmm at 77° F. In an embodiment, the filled coating formulation has a penetration ranging from 5-80 dmm at 77° F. In an embodiment, the filled coating formulation has a penetration ranging from 5-60 dmm at 77° F. In an embodiment, the filled coating formulation has a penetration ranging from 5-40 dmm at 77° F. In an embodiment, the filled coating formulation has a penetration ranging from 5-20 dmm at 77° F. In an embodiment, the filled coating formulation has a penetration ranging from 25-100 dmm at 77° F. In an embodiment, the filled coating formulation has a penetration ranging from 25-80 dmm at 77° F. In an embodiment, the filled coating formulation has a penetration ranging from 25-60 dmm at 77° F. In an embodiment, the filled coating formulation has a penetration ranging from 25-40 dmm at 77° F. In an embodiment, the filled coating formulation has a penetration ranging from 45-100 dmm at 77° F. In an embodiment, the filled coating formulation has a penetration ranging from 45-80 dmm at 77° F. In an embodiment, the filled coating formulation has a penetration ranging from 45-60 dmm at 77° F. In an embodiment, the filled coating formulation has a penetration ranging from 65-100 dmm at 77° F. In an embodiment, the filled coating formulation has a penetration ranging from 65-80 dmm at 77° F. In an embodiment, the filled coating formulation has a penetration ranging from 85-100 dmm at 77° F.

Another embodiment of the disclosure provides a non-filled coating formulation comprising:

20-90 wt % of a crude tall oil-based continuous phase material;

10-70 wt % of a resinous hardening agent; and 5-20 wt % of a polymer, wherein a viscosity of the non-filled coating formulation ranges from 200-12500 cP measured at 400° F.

Details regarding crude tall oil-based continuous phase materials, resinous hardening agents, polymers and additional components are as set forth above for the filled coating formulation. However, amounts of inclusion for these components can be different, given the absence of a filler. The ratio of polymer to crude tall oil-based continuous phase material and resinous hardening agent may be the same as set forth above for the filled coating formulation.

In an embodiment, the non-filled coating formulation comprises 20-90 wt % of crude tall oil-based continuous phase material. In an embodiment, the non-filled coating formulation comprises 20-80 wt % of crude tall oil-based continuous phase material. In an embodiment, the non-filled coating formulation comprises 20-70 wt % of crude tall oil-based continuous phase material. In an embodiment, the non-filled coating formulation comprises 20-60 wt % of crude tall oil-based continuous phase material. In an embodiment, the non-filled coating formulation comprises 20-50 wt % of crude tall oil-based continuous phase material. In an embodiment, the non-filled coating formulation comprises 20-40 wt % of crude tall oil-based continuous phase material. In an embodiment, the non-filled coating formulation comprises 20-30 wt % of crude tall oil-based continuous phase material. In an embodiment, the non-filled coating formulation comprises 30-90 wt % of crude tall oil-based continuous phase material. In an embodiment, the non-filled coating formulation comprises 30-80 wt % of crude tall oil-based continuous phase material. In an embodiment, the non-filled coating formulation comprises 30-70 wt % of crude tall oil-based continuous phase material. In an embodiment, the non-filled coating formulation comprises 30-60 wt % of crude tall oil-based continuous phase material. In an embodiment, the non-filled coating formulation comprises 30-50 wt % of crude tall oil-based continuous phase material. In an embodiment, the non-filled coating formulation comprises 30-40 wt % of crude tall oil-based continuous phase material. In an embodiment, the non-filled coating formulation comprises 40-90 wt % of crude tall oil-based continuous phase material. In an embodiment, the non-filled coating formulation comprises 40-80 wt % of crude tall oil-based continuous phase material. In an embodiment, the non-filled coating formulation comprises 40-70 wt % of crude tall oil-based continuous phase material. In an embodiment, the non-filled coating formulation comprises 40-60 wt % of crude tall oil-based continuous phase material. In an embodiment, the non-filled coating formulation comprises 40-50 wt % of crude tall oil-based continuous phase material. In an embodiment, the non-filled coating formulation comprises 50-90 wt % of crude tall oil-based continuous phase material. In an embodiment, the non-filled coating formulation comprises 50-80 wt % of crude tall oil-based continuous phase material. In an embodiment, the non-filled coating formulation comprises 50-70 wt % of crude tall oil-based continuous phase material. In an embodiment, the non-filled coating formulation comprises 50-60 wt % of crude tall oil-based continuous phase material. In an embodiment, the non-filled coating formulation comprises 60-90 wt % of crude tall oil-based continuous phase material. In an embodiment, the non-filled coating formulation comprises 60-80 wt % of crude tall oil-based continuous phase material. In an embodiment, the non-filled coating formulation comprises 60-70 wt % of crude tall oil-based continuous phase material. In an embodiment, the non-filled coating formulation comprises 70-90 wt % of crude tall oil-based continuous phase material. In an embodiment, the non-filled coating formulation comprises 70-80 wt % of crude tall oil-based continuous phase material. In an embodiment, the non-filled coating formulation comprises 80-90 wt % of crude tall oil-based continuous phase material.

In an embodiment, the non-filled coating formulation comprises 10-70 wt % of resinous hardening agent. In an embodiment, the non-filled coating formulation comprises 10-60 wt % of resinous hardening agent. In an embodiment, the non-filled coating formulation comprises 10-50 wt % of resinous hardening agent. In an embodiment, the non-filled coating formulation comprises 10-40 wt % of resinous hardening agent. In an embodiment, the non-filled coating formulation comprises 10-30 wt % of resinous hardening agent. In an embodiment, the non-filled coating formulation comprises 10-20 wt % of resinous hardening agent. In an embodiment, the non-filled coating formulation comprises 20-70 wt % of resinous hardening agent. In an embodiment, the non-filled coating formulation comprises 20-60 wt % of resinous hardening agent. In an embodiment, the non-filled coating formulation comprises 20-50 wt % of resinous hardening agent. In an embodiment, the non-filled coating formulation comprises 20-40 wt % of resinous hardening agent. In an embodiment, the non-filled coating formulation comprises 20-30 wt % of resinous hardening agent. In an embodiment, the non-filled coating formulation comprises 30-70 wt % of resinous hardening agent. In an embodiment, the non-filled coating formulation comprises 30-60 wt % of resinous hardening agent. In an embodiment, the non-filled coating formulation comprises 30-50 wt % of resinous hardening agent. In an embodiment, the non-filled coating formulation comprises 30-40 wt % of resinous hardening agent. In an embodiment, the non-filled coating formulation comprises 40-70 wt % of resinous hardening agent. In an embodiment, the non-filled coating formulation comprises 40-60 wt % of resinous hardening agent. In an embodiment, the non-filled coating formulation comprises 40-50 wt % of resinous hardening agent. In an embodiment, the non-filled coating formulation comprises 50-70 wt % of resinous hardening agent. In an embodiment, the non-filled coating formulation comprises 50-60 wt % of resinous hardening agent. In an embodiment, the non-filled coating formulation comprises 60-70 wt % of resinous hardening agent.

In an embodiment, the non-filled coating formulation comprises an amount of resinous hardening agent sufficient to achieve a viscosity ranging from 200-12,500 cP measured at 400° F. In an embodiment, the non-filled coating formulation comprises an amount of resinous hardening agent sufficient to achieve a viscosity ranging from 200-10,000 cP measured at 400° F. In an embodiment, the non-filled coating formulation comprises an amount of resinous hardening agent sufficient to achieve a viscosity ranging from 200-8,000 cP measured at 400° F. In an embodiment, the non-filled coating formulation comprises an amount of resinous hardening agent sufficient to achieve a viscosity ranging from 200-6,000 cP measured at 400° F. In an embodiment, the non-filled coating formulation comprises an amount of resinous hardening agent sufficient to achieve a viscosity ranging from 200-4,000 cP measured at 400° F. In an embodiment, the non-filled coating formulation comprises an amount of resinous hardening agent sufficient to achieve a viscosity ranging from 200-2,000 cP measured at 400° F. In an embodiment, the non-filled coating formulation comprises an amount of resinous hardening agent sufficient to achieve a viscosity ranging from 1,200-12,500 cP measured at 400° F. In an embodiment, the non-filled coating formulation comprises an amount of resinous hardening agent sufficient to achieve a viscosity ranging from 1,200-10,000 cP measured at 400° F. In an embodiment, the non-filled coating formulation comprises an amount of resinous hardening agent sufficient to achieve a viscosity ranging from 1,200-8,000 cP measured at 400° F. In an embodiment, the non-filled coating formulation comprises an amount of resinous hardening agent sufficient to achieve a viscosity ranging from 1,200-6,000 cP measured at 400° F. In an embodiment, the non-filled coating formulation comprises an amount of resinous hardening agent sufficient to achieve a viscosity ranging from 1,200-4,000 cP measured at 400° F. In an embodiment, the non-filled coating formulation comprises an amount of resinous hardening agent sufficient to achieve a viscosity ranging from 1,200-2,000 cP measured at 400° F. In an embodiment, the non-filled coating formulation comprises an amount of resinous hardening agent sufficient to achieve a viscosity ranging from 3,200-12,500 cP measured at 400° F. In an embodiment, the non-filled coating formulation comprises an amount of resinous hardening agent sufficient to achieve a viscosity ranging from 3,200-10,000 cP measured at 400° F. In an embodiment, the non-filled coating formulation comprises an amount of resinous hardening agent sufficient to achieve a viscosity ranging from 3,200-8,000 cP measured at 400° F. In an embodiment, the non-filled coating formulation comprises an amount of resinous hardening agent sufficient to achieve a viscosity ranging from 3,200-6,000 cP measured at 400° F. In an embodiment, the non-filled coating formulation comprises an amount of resinous hardening agent sufficient to achieve a viscosity ranging from 3,200-4,000 cP measured at 400° F. In an embodiment, the non-filled coating formulation comprises an amount of resinous hardening agent sufficient to achieve a viscosity ranging from 5,200-12,500 cP measured at 400° F. In an embodiment, the non-filled coating formulation comprises an amount of resinous hardening agent sufficient to achieve a viscosity ranging from 5,200-10,000 cP measured at 400° F. In an embodiment, the non-filled coating formulation comprises an amount of resinous hardening agent sufficient to achieve a viscosity ranging from 5,200-8,000 cP measured at 400° F. In an embodiment, the non-filled coating formulation comprises an amount of resinous hardening agent sufficient to achieve a viscosity ranging from 5,200-6,000 cP measured at 400° F. In an embodiment, the non-filled coating formulation comprises an amount of resinous hardening agent sufficient to achieve a viscosity ranging from 7,200-12,500 cP measured at 400° F. In an embodiment, the non-filled coating formulation comprises an amount of resinous hardening agent sufficient to achieve a viscosity ranging from 7,200-10,000 cP measured at 400° F. In an embodiment, the non-filled coating formulation comprises an amount of resinous hardening agent sufficient to achieve a viscosity ranging from 7,200-8,000 cP measured at 400° F. In an embodiment, the non-filled coating formulation comprises an amount of resinous hardening agent sufficient to achieve a viscosity ranging from 9,200-12,500 cP measured at 400° F. In an embodiment, the non-filled coating formulation comprises an amount of resinous hardening agent sufficient to achieve a viscosity ranging from 9,200-10,000 cP measured at 400° F. In an embodiment, the non-filled coating formulation comprises an amount of resinous hardening agent sufficient to achieve a viscosity ranging from 11,200-12,500 cP measured at 400° F.

In an embodiment, the non-filled coating formulation comprises 5-20 wt % of polymer. In an embodiment, the non-filled coating formulation comprises 5-17 wt % of polymer. In an embodiment, the non-filled coating formulation comprises 5-14 wt % of polymer. In an embodiment, the non-filled coating formulation comprises 5-11 wt % of polymer. In an embodiment, the non-filled coating formulation comprises 5-8 wt % of polymer. In an embodiment, the non-filled coating formulation comprises 8-20 wt % of polymer. In an embodiment, the non-filled coating formulation comprises 8-17 wt % of polymer. In an embodiment, the non-filled coating formulation comprises 8-14 wt % of polymer. In an embodiment, the non-filled coating formulation comprises 8-11 wt % of polymer. In an embodiment, the non-filled coating formulation comprises 11-20 wt % of polymer. In an embodiment, the non-filled coating formulation comprises 11-17 wt % of polymer. In an embodiment, the non-filled coating formulation comprises 11-14 wt % of polymer. In an embodiment, the non-filled coating formulation comprises 14-20 wt % of polymer. In an embodiment, the non-filled coating formulation comprises 14-17 wt % of polymer. In an embodiment, the non-filled coating formulation comprises 17-20 wt % of polymer.

In an embodiment, the non-filled coating formulation has a softening point ranging from 145-305° F. In an embodiment, the non-filled coating formulation has a softening point ranging from 145-275° F. In an embodiment, the non-filled coating formulation has a softening point ranging from 145-250° F. In an embodiment, the non-filled coating formulation has a softening point ranging from 145-225° F. In an embodiment, the non-filled coating formulation has a softening point ranging from 145-200° F. In an embodiment, the non-filled coating formulation has a softening point ranging from 145-175° F. In an embodiment, the non-filled coating formulation has a softening point ranging from 145-150° F. In an embodiment, the non-filled coating formulation has a softening point ranging from 150-305° F. In an embodiment, the non-filled coating formulation has a softening point ranging from 150-275° F. In an embodiment, the non-filled coating formulation has a softening point ranging from 150-250° F. In an embodiment, the non-filled coating formulation has a softening point ranging from 150-225° F. In an embodiment, the non-filled coating formulation has a softening point ranging from 150-200° F. In an embodiment, the non-filled coating formulation has a softening point ranging from 150-175° F. In an embodiment, the non-filled coating formulation has a softening point ranging from 175-305° F. In an embodiment, the non-filled coating formulation has a softening point ranging from 175-275° F. In an embodiment, the non-filled coating formulation has a softening point ranging from 175-250° F. In an embodiment, the non-filled coating formulation has a softening point ranging from 175-225° F. In an embodiment, the non-filled coating formulation has a softening point ranging from 175-200° F. In an embodiment, the non-filled coating formulation has a softening point ranging from 200-305° F. In an embodiment, the non-filled coating formulation has a softening point ranging from 200-275° F. In an embodiment, the non-filled coating formulation has a softening point ranging from 200-250° F. In an embodiment, the non-filled coating formulation has a softening point ranging from 200-225° F. In an embodiment, the non-filled coating formulation has a softening point ranging from 225-305° F. In an embodiment, the non-filled coating formulation has a softening point ranging from 225-275° F. In an embodiment, the non-filled coating formulation has a softening point ranging from 225-250° F. In an embodiment, the non-filled coating formulation has a softening point ranging from 250-305° F. In an embodiment, the non-filled coating formulation has a softening point ranging from 250-275° F. In an embodiment, the non-filled coating formulation has a softening point ranging from 275-305° F.

In an embodiment, the non-filled coating formulation has a penetration ranging from 15-150 dmm at 77° F. In an embodiment, the non-filled coating formulation has a penetration ranging from 15-130 dmm at 77° F. In an embodiment, the non-filled coating formulation has a penetration ranging from 15-110 dmm at 77° F. In an embodiment, the non-filled coating formulation has a penetration ranging from 15-90 dmm at 77° F. In an embodiment, the non-filled coating formulation has a penetration ranging from 15-70 dmm at 77° F. In an embodiment, the non-filled coating formulation has a penetration ranging from 15-50 dmm at 77° F. In an embodiment, the non-filled coating formulation has a penetration ranging from 15-30 dmm at 77° F. In an embodiment, the non-filled coating formulation has a penetration ranging from 35-150 dmm at 77° F. In an embodiment, the non-filled coating formulation has a penetration ranging from 35-130 dmm at 77° F. In an embodiment, the non-filled coating formulation has a penetration ranging from 35-110 dmm at 77° F. In an embodiment, the non-filled coating formulation has a penetration ranging from 35-90 dmm at 77° F. In an embodiment, the non-filled coating formulation has a penetration ranging from 35-70 dmm at 77° F. In an embodiment, the non-filled coating formulation has a penetration ranging from 35-50 dmm at 77° F. In an embodiment, the non-filled coating formulation has a penetration ranging from 55-150 dmm at 77° F. In an embodiment, the non-filled coating formulation has a penetration ranging from 55-130 dmm at 77° F. In an embodiment, the non-filled coating formulation has a penetration ranging from 55-110 dmm at 77° F. In an embodiment, the non-filled coating formulation has a penetration ranging from 55-90 dmm at 77° F. In an embodiment, the non-filled coating formulation has a penetration ranging from 55-70 dmm at 77° F. In an embodiment, the non-filled coating formulation has a penetration ranging from 75-150 dmm at 77° F. In an embodiment, the non-filled coating formulation has a penetration ranging from 75-130 dmm at 77° F. In an embodiment, the non-filled coating formulation has a penetration ranging from 75-110 dmm at 77° F. In an embodiment, the non-filled coating formulation has a penetration ranging from 75-90 dmm at 77° F. In an embodiment, the non-filled coating formulation has a penetration ranging from 95-150 dmm at 77° F. In an embodiment, the non-filled coating formulation has a penetration ranging from 95-130 dmm at 77° F. In an embodiment, the non-filled coating formulation has a penetration ranging from 95-110 dmm at 77° F. In an embodiment, the non-filled coating formulation has a penetration ranging from 115-150 dmm at 77° F. In an embodiment, the non-filled coating formulation has a penetration ranging from 115-130 dmm at 77° F. In an embodiment, the non-filled coating formulation has a penetration ranging from 135-150 dmm at 77° F.

Another embodiment of the disclosure provides a non-asphaltic roofing shingle comprising a substrate having a coating which comprises a crude tall oil-based continuous phase material, a resinous hardening agent, a polymer, and a filler, wherein the softening point of the coating ranges from 175-320° F., and wherein the penetration of the coating ranges from 5-100 dmm measured at 77° F.

The coating in this embodiment is based on the filled coating formulation described above. Details regarding crude tall oil-based continuous phase materials, resinous hardening agents, polymers and additional components, as well as inclusion amounts and softening point and penetration ranges, are as set forth above for the filled coating formulation.

In an embodiment, the substrate comprises a fiberglass mat, a polyester mat, a scrim, a coated scrim, or a combination thereof. In an embodiment, the substrate comprises a synthetic or natural scrim. In some embodiments, the substrate or mat includes nano-fibrillated cellulose fibers.

In an embodiment, the non-asphaltic roofing shingle is configured to be prepared on a substantially standard manufacturing line for asphaltic shingles at a standard speed, ranging from 110 feet per minute (FPM) to 1000 feet per minute (FPM). A non-limiting example of a substantially standard manufacturing line for asphaltic shingles is detailed in U.S. Pat. No. 10,195,640, the contents of which are hereby incorporated by reference.

In an embodiment, the non-asphaltic roofing shingle is a single layer shingle or a laminated shingle having two or more layers.

In an embodiment, the non-asphaltic roofing shingle satisfies ICC acceptance criteria for an alternative non-asphaltic shingle.

In an embodiment, the non-asphaltic roofing shingle further comprises granules. In an embodiment, granules are applied to a surface of the non-asphaltic roofing shingle. In an embodiment, the non-asphaltic roofing shingle includes mineral surfacing, such as, e.g., fines, granules, sand, metal flakes and/or reflective granules. In an embodiment, the non-asphaltic roofing shingle includes polymer films and/or synthetic and/or natural non-woven and/or woven fabrics, with or without decorative elements, including, for example, printing, embossing and/or protective coatings, on the coating. In an embodiment, photo (e.g., UV) and/or thermal stabilizers are added to a surface of the coating and/or non-asphaltic roofing shingle.

In an embodiment, a thickness of the coating on the substrate ranges from 5-100 mils, from 10-80 mils, or from 15-40 mils.

In an embodiment, the non-asphaltic roofing shingle comprises one or more layers of the coating, discussed above. In some embodiments, there are one to fifteen layers of the coating. In some embodiments, there are one to twelve layers of the coating. In some embodiments, there are one to ten layers of the coating. In some embodiments, there are one to eight layers of the coating. In some embodiments, there are one to five layers of the coating. In some embodiments, there are one to three layers of the coating. In some embodiments, there are three to fifteen layers of the coating. In some embodiments, there are five to fifteen layers of the coating. In some embodiments, there are eight to fifteen layers of the coating. In some embodiments, there are ten to fifteen layers of the coating. In some embodiments, there are twelve to fifteen layers of the coating.

In an embodiment, the coating comprises at least one layer that is applied to both a top surface and a bottom surface of the substrate.

Another embodiment of the disclosure provides a non-asphaltic roofing shingle comprising a substrate having a non-filled coating which comprises a crude tall oil-based continuous phase material, a resinous hardening agent, and a polymer, wherein the softening point of the coating ranges from 145-305° F., and wherein the penetration of the coating ranges from 15-150 dmm measured at 77° F.

The coating in this embodiment is based on the non-filled coating formulation described above. Details regarding crude tall oil-based continuous phase materials, resinous hardening agents, polymers and additional components, as well as inclusion amounts and softening point and penetration ranges, are as set forth above for the non-filled coating formulation. In addition, details regarding the substrate, manufacturing, and structure of the non-asphaltic roofing shingle are as set forth above for the non-asphaltic roofing shingle coated with the filled coating formulation.

Additional embodiments of the disclosure provide other roofing materials such as underlayment, modified bitumen roofing ("mod bit"), rolled product, roofing membrane, etc., any of which comprising the filled coating formulation or the non-filled coating formulation described above.

Another embodiment of the disclosure provides a method comprising: obtaining a substrate; and coating the substrate with a filled coating formulation to form a non-asphaltic roofing material, wherein the filled coating formulation comprises 5-40 wt % of a crude tall oil-based continuous phase material; 3-35 wt % of a resinous hardening agent; 1-10 wt % of a polymer; and a filler, and wherein a viscosity of the filled coating formulation ranges from 2000-20000 cP measured at 400° F.

The coating in this embodiment is based on the filled coating formulation described above. Details regarding crude tall oil-based continuous phase materials, resinous hardening agents, polymers and additional components, as well as inclusion amounts, softening point, and penetration, are as set forth above for the filled coating formulation. In addition, details regarding the substrate, as well as the characteristics of the non-asphaltic roofing material resulting from coating the substrate with the filled coating formulation may be as set forth above for the non-asphaltic roofing shingle coated with the filled coating formulation.

In an embodiment, coating the substrate is performed on a substantially standard manufacturing line for asphaltic shingles at a standard speed, ranging from 110 feet per minute (FPM) to 1000 feet per minute (FPM). As noted above, a non-limiting example of a substantially standard manufacturing line for asphaltic shingles is detailed in U.S. Pat. No. 10,195,640.

In some embodiments of the method, one or more additional manufacturing steps are carried out. Some embodiments of the method further comprise applying granules, applying a polymer film or fabric, and/or photo and/or thermal stabilizers to a surface of the non-asphaltic roofing shingle. Details regarding the granules, polymer film or fabric, and photo and/or thermal stabilizers are as set forth above for the non-asphaltic roofing shingle coated with the filled coating formulation. In an embodiment, the method further comprises applying one or more layers of the coating to form a non-asphaltic roofing material.

In an embodiment, the method further comprises preparing the coating. In an embodiment, the coating is prepared by mixing the components using static mixing, a low shear mixer, and/or a high shear mixer. A non-limiting example of a low shear mixer is EUROSTAR® 60 Digital, IKA Works, Inc., Wilmington, N.C., which mixes batches at about 500 to 1500 RPM, with a paddle-type blade to generate low shear. A non-limiting example of a high shear mixer is SILVERSON® L5M-A Laboratory Mixer, Silverson Machines, Inc., East Longmeadow, Mass., which mixes batches at or above 1000 RPM, with a blade and a head that are configured to generate high shear, as well as heat mixing.

In an embodiment, the coating is in the form of a pourable coating formulation that is poured onto a substrate on one or both sides and roll pressed to impregnate and saturate the substrate. In an embodiment, granules are then applied. Some embodiments of the method further comprise cutting the formed non-asphaltic roofing material to provide one or more roofing shingle layers and configuring the one or more layers to provide a shingle having the desired structure.

Another embodiment of the disclosure provides a method comprising: obtaining a substrate; and coating the substrate with a non-filled coating formulation to form a non-asphaltic roofing material, wherein the non-filled coating formulation comprises 20-90 wt % of a crude tall oil-based material, 10-70 wt % of a resinous hardening agent, and 5-20 wt % of a polymer, and wherein a viscosity of the coating formulation ranges from 200-12,500 cP measured at 400° F.

The coating in this embodiment is based on the non-filled coating formulation described above. Details regarding crude tall oil-based continuous phase materials, resinous hardening agents, polymers and additional components, as well as the inclusion amounts, softening point and penetration, are as set forth above for the non-filled coating formulation. In addition, details regarding the substrate, as well as the characteristics of the non-asphaltic roofing material resulting from coating the substrate with the non-filled coating formulation may be as set forth above for the non-asphaltic roofing shingle coated with the non-filled coating formulation. Details regarding manufacturing steps are as set forth above for the method which employs the filled coating formulation, though adjustments may be made to account for viscosity differences.

The disclosure provides additional alternative embodiments in which the crude tall oil-based continuous phase material is replaced by or used in conjunction with a plant- or bio-derived continuous phase material. One such alternative embodiment of the disclosure provides a non-filled coating formulation comprising:

20-60 wt % of a plant- or bio-derived continuous phase material;

30-75 wt % of a resinous hardening agent; and 5-20 wt % of a polymer, wherein a viscosity of the non-filled coating formulation ranges from 200-12500 cP measured at 400° F.

Non-limiting examples of plant- or bio-derived continuous phase materials used in the present disclosure include, without limitation, corn oil, vegetable oil, triglycerides, renewable oil technology, and combinations thereof. In an embodiment, the plant- or bio-derived continuous phase material is Anova 1815 (Cargill), low viscosity vegetable oil (Cargill), renewable oil technology based on triglycerides (such as Tufftrek 4002) or any combination thereof. As used herein, "plant- or bio-based continuous phase material(s)" refers to any continuous phase material derived from a plant- or bio-source, including chemically modified or functionalized versions thereof; for purposes of the present disclosure, the plant- or bio-derived continuous phase material is not a crude tall oil-based continuous phase material as defined above (although crude tall oil-based continuous phase materials are plant-derived). The plant- or bio-derived continuous phase material may be used alone as a continuous phase material or may be used in combination with a crude tall oil-based continuous phase material as described above.

Details regarding resinous hardening agents, polymers and additional components are as set forth above for the filled coating formulation comprising a crude tall oil-based continuous phase material. However, amounts of inclusion for these components can be different.

In an embodiment, the non-filled coating formulation comprising a plant- or bio-based continuous phase material comprises 20-60 wt % of plant- or bio-derived continuous phase material. In an embodiment, the non-filled coating formulation comprises 20-50 wt % of plant- or bio-derived continuous phase material. In an embodiment, the non-filled coating formulation comprises 20-40 wt % of plant- or bio-derived continuous phase material. In an embodiment, the non-filled coating formulation comprises 20-30 wt % of plant- or bio-derived continuous phase material. In an embodiment, the non-filled coating formulation comprising a plant- or bio-based continuous phase material comprises 30-60 wt % of plant- or bio-derived continuous phase material. In an embodiment, the non-filled coating formulation comprises 30-50 wt % of plant- or bio-derived continuous phase material. In an embodiment, the non-filled coating formulation comprises 30-40 wt % of plant- or bio-derived continuous phase material. In an embodiment, the non-filled coating formulation comprising a plant- or bio-based continuous phase material comprises 40-60 wt % of plant- or bio-derived continuous phase material. In an embodiment, the non-filled coating formulation comprises 40-50 wt % of plant- or bio-derived continuous phase material. In an embodiment, the non-filled coating formulation comprises 50-60 wt % of plant- or bio-derived continuous phase material.

In an embodiment, the non-filled coating formulation comprising a plant- or bio-derived continuous phase material comprises 30-75 wt % of resinous hardening agent. In an embodiment, the non-filled coating formulation comprises 30-70 wt % of resinous hardening agent. In an embodiment, the non-filled coating formulation comprises 30-65 wt % of resinous hardening agent. In an embodiment, the non-filled coating formulation comprises 30-60 wt % of resinous hardening agent. In an embodiment, the non-filled coating formulation comprises 30-55 wt % of resinous hardening agent. In an embodiment, the non-filled coating formulation comprises 30-50 wt % of resinous hardening agent. In an embodiment, the non-filled coating formulation comprises 30-45 wt % of resinous hardening agent. In an embodiment, the non-filled coating formulation comprises 30-40 wt % of resinous hardening agent. In an embodiment, the non-filled coating formulation comprises 30-35 wt % of resinous hardening agent. In an embodiment, the non-filled coating formulation comprising a plant- or bio-derived continuous phase material comprises 35-75 wt % of resinous hardening agent. In an embodiment, the non-filled coating formulation comprises 35-70 wt % of resinous hardening agent. In an embodiment, the non-filled coating formulation comprises 35-65 wt % of resinous hardening agent. In an embodiment, the non-filled coating formulation comprises 35-60 wt % of resinous hardening agent. In an embodiment, the non-filled coating formulation comprises 35-55 wt % of resinous hardening agent. In an embodiment, the non-filled coating formulation comprises 35-50 wt % of resinous hardening agent. In an embodiment, the non-filled coating formulation comprises 35-45 wt % of resinous hardening agent. In an embodiment, the non-filled coating formulation comprises 35-40 wt % of resinous hardening agent. In an embodiment, the non-filled coating formulation comprising a plant- or bio-derived continuous phase material comprises 40-75 wt % of resinous hardening agent. In an embodiment, the non-filled coating formulation comprises 40-70 wt % of resinous hardening agent. In an embodiment, the non-filled coating formulation comprises 40-65 wt % of resinous hardening agent. In an embodiment, the non-filled coating formulation comprises 40-60 wt % of resinous hardening agent. In an embodiment, the non-filled coating formulation comprises 40-55 wt % of resinous hardening agent. In an embodiment, the non-filled coating formulation comprises 40-50 wt % of resinous hardening agent. In an embodiment, the non-filled coating formulation comprises 40-45 wt % of resinous hardening agent. In an embodiment, the non-filled coating formulation comprising a plant- or bio-derived continuous phase material comprises 45-75 wt % of resinous hardening agent. In an embodiment, the non-filled coating formulation comprises 45-70 wt % of resinous hardening agent. In an embodiment, the non-filled coating formulation comprises 45-65 wt % of resinous hardening agent. In an embodiment, the non-filled coating formulation comprises 45-60 wt % of resinous hardening agent. In an embodiment, the non-filled coating formulation comprises 45-55 wt % of resinous hardening agent. In an embodiment, the non-filled coating formulation comprises 45-50 wt % of resinous hardening agent. In an embodiment, the non-filled coating formulation comprising a plant- or bio-derived continuous phase material comprises 50-75 wt % of resinous hardening agent. In an embodiment, the non-filled coating formulation comprises 50-70 wt % of resinous hardening agent. In an embodiment, the non-filled coating formulation comprises 50-65 wt % of resinous hardening agent. In an embodiment, the non-filled coating formulation comprises 50-60 wt % of resinous hardening agent. In an embodiment, the non-filled coating formulation comprises 50-55 wt % of resinous hardening agent. In an embodiment, the non-filled coating formulation comprising a plant- or bio-derived continuous phase material comprises 55-75 wt % of resinous hardening agent. In an embodiment, the non-filled coating formulation comprises 55-70 wt % of resinous hardening agent. In an embodiment, the non-filled coating formulation comprises 55-65 wt % of resinous hardening agent. In an embodiment, the non-filled coating formulation comprises 55-60 wt % of resinous hardening agent. In an embodiment, the non-filled coating formulation comprising a plant- or bio-derived continuous phase material comprises 60-75 wt % of resinous hardening agent. In an embodiment, the non-filled coating formulation comprises 60-70 wt % of resinous hardening agent. In an embodiment, the non-filled coating formulation comprises 60-65 wt % of resinous hardening agent. In an embodiment, the non-filled coating formulation comprising a plant- or bio-derived continuous phase material comprises 65-75 wt % of resinous hardening agent. In an embodiment, the non-filled coating formulation comprises 65-70 wt % of resinous hardening agent. In an embodiment, the non-filled coating formulation comprises 70-75 wt % of resinous hardening agent.

In an embodiment, the non-filled coating formulation comprising a plant- or bio-derived continuous phase material comprises an amount of resinous hardening agent sufficient to achieve a viscosity ranging from 200-12,500 cP measured at 400° F. In an embodiment, the non-filled coating formulation comprising a plant- or bio-derived continuous phase material comprises an amount of resinous hardening agent sufficient to achieve a viscosity ranging from 200-10,000 cP measured at 400° F. In an embodiment, the non-filled coating formulation comprising a plant- or bio-derived continuous phase material comprises an amount of resinous hardening agent sufficient to achieve a viscosity ranging from 200-8,000 cP measured at 400° F. In an embodiment, the non-filled coating formulation comprising a plant- or bio-derived continuous phase material comprises an amount of resinous hardening agent sufficient to achieve a viscosity ranging from 200-6,000 cP measured at 400° F. In an embodiment, the non-filled coating formulation comprising a plant- or bio-derived continuous phase material comprises an amount of resinous hardening agent sufficient to achieve a viscosity ranging from 200-4,000 cP measured at 400° F. In an embodiment, the non-filled coating formulation comprising a plant- or bio-derived continuous phase material comprises an amount of resinous hardening agent sufficient to achieve a viscosity ranging from 200-2,000 cP measured at 400° F. In an embodiment, the non-filled coating formulation comprising a plant- or bio-derived continuous phase material comprises an amount of resinous hardening agent sufficient to achieve a viscosity ranging from 1,200-12,500 cP measured at 400° F. In an embodiment, the non-filled coating formulation comprising a plant- or bio-derived continuous phase material comprises an amount of resinous hardening agent sufficient to achieve a viscosity ranging from 1,200-10,000 cP measured at 400° F. In an embodiment, the non-filled coating formulation comprising a plant- or bio-derived continuous phase material comprises an amount of resinous hardening agent sufficient to achieve a viscosity ranging from 1,200-8,000 cP measured at 400° F. In an embodiment, the non-filled coating formulation comprising a plant- or bio-derived continuous phase material comprises an amount of resinous hardening agent sufficient to achieve a viscosity ranging from 1,200-6,000 cP measured at 400° F. In an embodiment, the non-filled coating formulation comprising a plant- or bio-derived continuous phase material comprises an amount of resinous hardening agent sufficient to achieve a viscosity ranging from 1,200-4,000 cP measured at 400° F. In an embodiment, the non-filled coating formulation comprising a plant- or bio-derived continuous phase material comprises an amount of resinous hardening agent sufficient to achieve a viscosity ranging from 1,200-2,000 cP measured at 400° F. In an embodiment, the non-filled coating formulation comprising a plant- or bio-derived continuous phase material comprises an amount of resinous hardening agent sufficient to achieve a viscosity ranging from 3,200-12,500 cP measured at 400° F. In an embodiment, the non-filled coating formulation comprising a plant- or bio-derived continuous phase material comprises an amount of resinous hardening agent sufficient to achieve a viscosity ranging from 3,200-10,000 cP measured at 400° F. In an embodiment, the non-filled coating formulation comprising a plant- or bio-derived continuous phase material comprises an amount of resinous hardening agent sufficient to achieve a viscosity ranging from 3,200-8,000 cP measured at 400° F. In an embodiment, the non-filled coating formulation comprising a plant- or bio-derived continuous phase material comprises an amount of resinous hardening agent sufficient to achieve a viscosity ranging from 3,200-6,000 cP measured at 400° F. In an embodiment, the non-filled coating formulation comprising a plant- or bio-derived continuous phase material comprises an amount of resinous hardening agent sufficient to achieve a viscosity ranging from 3,200-4,000 cP measured at 400° F. In an embodiment, the non-filled coating formulation comprising a plant- or bio-derived continuous phase material comprises an amount of resinous hardening agent sufficient to achieve a viscosity ranging from 5,200-12,500 cP measured at 400° F. In an embodiment, the non-filled coating formulation comprising a plant- or bio-derived continuous phase material comprises an amount of resinous hardening agent sufficient to achieve a viscosity ranging from 5,200-10,000 cP measured at 400° F. In an embodiment, the non-filled coating formulation comprising a plant- or bio-derived continuous phase material comprises an amount of resinous hardening agent sufficient to achieve a viscosity ranging from 5,200-8,000 cP measured at 400° F. In an embodiment, the non-filled coating formulation comprising a plant- or bio-derived continuous phase material comprises an amount of resinous hardening agent sufficient to achieve a viscosity ranging from 5,200-6,000 cP measured at 400° F. In an embodiment, the non-filled coating formulation comprising a plant- or bio-derived continuous phase material comprises an amount of resinous hardening agent sufficient to achieve a viscosity ranging from 7,200-12,500 cP measured at 400° F. In an embodiment, the non-filled coating formulation comprising a plant- or bio-derived continuous phase material comprises an amount of resinous hardening agent sufficient to achieve a viscosity ranging from 7,200-10,000 cP measured at 400° F. In an embodiment, the non-filled coating formulation comprising a plant- or bio-derived continuous phase material comprises an amount of resinous hardening agent sufficient to achieve a viscosity ranging from 7,200-8,000 cP measured at 400° F. In an embodiment, the non-filled coating formulation comprising a plant- or bio-derived continuous phase material comprises an amount of resinous hardening agent sufficient to achieve a viscosity ranging from 9,200-12,500 cP measured at 400° F. In an embodiment, the non-filled coating formulation comprising a plant- or bio-derived continuous phase material comprises an amount of resinous hardening agent sufficient to achieve a viscosity ranging from 9,200-10,000 cP measured at 400° F. In an embodiment, the non-filled coating formulation comprising a plant- or bio-derived continuous phase material comprises an amount of resinous hardening agent sufficient to achieve a viscosity ranging from 11,200-12,500 cP measured at 400° F.

In an embodiment, the non-filled coating formulation comprising a plant- or bio-derived continuous phase material comprises 5-20 wt % of polymer. In an embodiment, the non-filled coating formulation comprises 5-17 wt % of polymer. In an embodiment, the non-filled coating formulation comprises 5-14 wt % of polymer. In an embodiment, the non-filled coating formulation comprises 5-11 wt % of polymer. In an embodiment, the non-filled coating formulation comprises 5-8 wt % of polymer. In an embodiment, the non-filled coating formulation comprising a plant- or bio-derived continuous phase material comprises 8-20 wt % of polymer. In an embodiment, the non-filled coating formulation comprises 8-17 wt % of polymer. In an embodiment, the non-filled coating formulation comprises 8-14 wt % of polymer. In an embodiment, the non-filled coating formulation comprises 8-11 wt % of polymer. In an embodiment, the non-filled coating formulation comprising a plant- or bio-derived continuous phase material comprises 11-20 wt % of polymer. In an embodiment, the non-filled coating formulation comprises 11-17 wt % of polymer. In an embodiment, the non-filled coating formulation comprises 11-14 wt % of polymer. In an embodiment, the non-filled coating formulation comprising a plant- or bio-derived continuous phase material comprises 14-20 wt % of polymer. In an embodiment, the non-filled coating formulation comprises 14-17 wt % of polymer. In an embodiment, the non-filled coating formulation comprises 17-20 wt % of polymer.

In an embodiment, the non-filled coating formulation comprising a plant- or bio-derived continuous phase material has a softening point ranging from 145-305° F. In an embodiment, the non-filled coating formulation has a softening point ranging from 145-275° F. In an embodiment, the non-filled coating formulation has a softening point ranging from 145-250° F. In an embodiment, the non-filled coating formulation has a softening point ranging from 145-225° F. In an embodiment, the non-filled coating formulation has a softening point ranging from 145-200° F. In an embodiment, the non-filled coating formulation has a softening point ranging from 145-175° F. In an embodiment, the non-filled coating formulation has a softening point ranging from 145-150° F. In an embodiment, the non-filled coating formulation has a softening point ranging from 150-305° F. In an embodiment, the non-filled coating formulation has a softening point ranging from 150-275° F. In an embodiment, the non-filled coating formulation has a softening point ranging from 150-250° F. In an embodiment, the non-filled coating formulation has a softening point ranging from 150-225° F. In an embodiment, the non-filled coating formulation has a softening point ranging from 150-200° F. In an embodiment, the non-filled coating formulation has a softening point ranging from 150-175° F. In an embodiment, the non-filled coating formulation has a softening point ranging from 175-305° F. In an embodiment, the non-filled coating formulation has a softening point ranging from 175-275° F. In an embodiment, the non-filled coating formulation has a softening point ranging from 175-250° F. In an embodiment, the non-filled coating formulation has a softening point ranging from 175-225° F. In an embodiment, the non-filled coating formulation has a softening point ranging from 175-200° F. In an embodiment, the non-filled coating formulation has a softening point ranging from 200-305° F. In an embodiment, the non-filled coating formulation has a softening point ranging from 200-275° F. In an embodiment, the non-filled coating formulation has a softening point ranging from 200-250° F. In an embodiment, the non-filled coating formulation has a softening point ranging from 200-225° F. In an embodiment, the non-filled coating formulation has a softening point ranging from 225-305° F. In an embodiment, the non-filled coating formulation has a softening point ranging from 225-275° F. In an embodiment, the non-filled coating formulation has a softening point ranging from 225-250° F. In an embodiment, the non-filled coating formulation has a softening point ranging from 250-305° F. In an embodiment, the non-filled coating formulation has a softening point ranging from 250-275° F. In an embodiment, the non-filled coating formulation has a softening point ranging from 275-305° F.

In an embodiment, the non-filled coating formulation comprising a plant- or bio-derived continuous phase material has a penetration ranging from 15-150 dmm at 77° F. In an embodiment, the non-filled coating formulation has a penetration ranging from 15-130 dmm at 77° F. In an embodiment, the non-filled coating formulation has a penetration ranging from 15-110 dmm at 77° F. In an embodiment, the non-filled coating formulation has a penetration ranging from 15-90 dmm at 77° F. In an embodiment, the non-filled coating formulation has a penetration ranging from 15-70 dmm at 77° F. In an embodiment, the non-filled coating formulation has a penetration ranging from 15-50 dmm at 77° F. In an embodiment, the non-filled coating formulation has a penetration ranging from 15-30 dmm at 77° F. In an embodiment, the non-filled coating formulation has a penetration ranging from 35-150 dmm at 77° F. In an embodiment, the non-filled coating formulation has a penetration ranging from 35-130 dmm at 77° F. In an embodiment, the non-filled coating formulation has a penetration ranging from 35-110 dmm at 77° F. In an embodiment, the non-filled coating formulation has a penetration ranging from 35-90 dmm at 77° F. In an embodiment, the non-filled coating formulation has a penetration ranging from 35-70 dmm at 77° F. In an embodiment, the non-filled coating formulation has a penetration ranging from 35-50 dmm at 77° F. In an embodiment, the non-filled coating formulation has a penetration ranging from 55-150 dmm at 77° F. In an embodiment, the non-filled coating formulation has a penetration ranging from 55-130 dmm at 77° F. In an embodiment, the non-filled coating formulation has a penetration ranging from 55-110 dmm at 77° F. In an embodiment, the non-filled coating formulation has a penetration ranging from 55-90 dmm at 77° F. In an embodiment, the non-filled coating formulation has a penetration ranging from 55-70 dmm at 77° F. In an embodiment, the non-filled coating formulation has a penetration ranging from 75-150 dmm at 77° F. In an embodiment, the non-filled coating formulation has a penetration ranging from 75-130 dmm at 77° F. In an embodiment, the non-filled coating formulation has a penetration ranging from 75-110 dmm at 77° F. In an embodiment, the non-filled coating formulation has a penetration ranging from 75-90 dmm at 77° F. In an embodiment, the non-filled coating formulation has a penetration ranging from 95-150 dmm at 77° F. In an embodiment, the non-filled coating formulation has a penetration ranging from 95-130 dmm at 77° F. In an embodiment, the non-filled coating formulation has a penetration ranging from 95-110 dmm at 77° F. In an embodiment, the non-filled coating formulation has a penetration ranging from 115-150 dmm at 77° F. In an embodiment, the non-filled coating formulation has a penetration ranging from 115-130 dmm at 77° F. In an embodiment, the non-filled coating formulation has a penetration ranging from 135-150 dmm at 77° F.

Further alternative embodiments of the disclosure include a filled coating formulation comprising a plant- or bio-derived continuous phase material, a resinous hardening agent, a polymer, and a filler; a non-asphaltic roofing shingle comprising a substrate having a coating which comprises a plant- or bio-derived continuous phase material, a resinous hardening agent, a polymer, and a filler; and a method comprising obtaining a substrate and coating the substrate with a filled coating formulation to form a non-asphaltic roofing material, wherein the filled coating formulation comprises a plant- or bio-derived continuous phase material, a resinous hardening agent, a polymer, and a filler.

EXAMPLES

Specific embodiments of the invention will now be demonstrated by reference to the following examples. It should be understood that these examples are disclosed by way of illustrating the disclosure and should not be taken in any way to limit the scope of the present disclosure.

Examples 1 and 2 and Comparative Examples A-D

Blends of different crude tall oil-based continuous phase materials and resinous hardening agents were made and characterized as set forth in Table 1 below:

TABLE 1

Softening Points of Tall Oil Pitch/Rosin Ester Blends.

| Tall oil pitch (TOP) | Rosin ester | Ratio of TOP/rosin ester (w/w) | Softening point (SP), ° F. |
| --- | --- | --- | --- |
| Sylfat DP-1 | — | 1:0 | <77 |
| Sylfat DP-8 | — | 1:0 | <77 |
| Sylfat DP-1 | Sylvatac RE-98 | 1:1 | 113 |
| Sylfat DP-1 | Sylvacote 7097 | 1:1 | 164 |

TABLE 1-continued

Softening Points of Tall Oil Pitch/Rosin Ester Blends.

| Tall oil pitch (TOP) | Rosin ester | Ratio of TOP/rosin ester (w/w) | Softening point (SP), ° F. |
|---|---|---|---|
| Sylfat DP-1 | Dertoline P110 | 1:1 | 119 |
| Sylfat DP-8 | Sylvacote 7097 | 1:1 | 125 |

The addition of a resinous hardening agent to a crude tall oil-based continuous phase material increased the softening point. However, in order to obtain a sufficiently flexible material, as well as meet other property requirements, a polymer component was also added as set forth in Table 2 to form non-filled coating formulations according to the present disclosure.

TABLE 2

Physical Properties of Formulations Acceptable as Roofing Materials.

| Formulation No. | Example 1 | Example 2 |
|---|---|---|
| TOP, wt % | DP-1, 44 wt % | DP-8, 44 wt % |
| Rosin ester, wt % | P110, 44 wt % | P110, 44 wt % |
| SBS, wt % | D-1184, 10 wt % | D-1184, 10 wt % |
| SEBS, wt % | G-1650, 2 wt % | G-1650, 2 wt % |
| SP, ° F. | 206 | 242 |
| Penetration, dmm at 77° F. | 54 | 60 |
| Viscosity, cP at 400° F. | 947 | 1307 |

The omission of the rosin ester in a formulation leads to material property deficiencies. This is shown in Table 3 below.

TABLE 3

Comparison of Formulation Physical Properties with and without Rosin Esters.

| Formulation No. | Example 2 | Comparative Example A | Comparative Example B | Comparative Example C | Comparative Example D |
|---|---|---|---|---|---|
| TOP, wt % | DP-8, 44 wt % | DP-8, 90 wt % | DP-8, 95 wt % | DP-8, 90 wt % | DP-8, 82 wt % |
| Rosin ester, wt % | P110, 44 wt % | — | — | — | — |
| SBS, wt % | D-1184, 10 wt % | D-1184, 8 wt % | D-1184, 5 wt % | D-1184, 10 wt % | D-1184, 18 wt % |
| SEBS, wt % | G-1650, 2 wt % | G-1650, 2 wt % | — | — | — |
| SP, ° F. | 242 | 201 | 154 | 216 | 260 |
| Penetration, dmm at 77° F. | 60 | 200 | Too soft to determine | 144 | 102 |
| Viscosity, cP at 400° F. | 1307 | 188 | Not tested | 96 | 2611 (360° F.) |

In Comparative Example A, the softening point was acceptable, and the viscosity was comparable to asphalt; however, the material was very soft, as shown by the penetration data and had little mechanical integrity. Comparative Example B clearly did not have enough polymer to raise the softening point sufficiently and was too soft. Comparative Examples C and D had acceptable softening points; however, Comparative Example C was still very soft and had little mechanical strength, while Comparative Example D was very viscous.

Corresponding filled coating formulations were prepared according to the present disclosure by adding limestone filler to the non-filled coating formulations of Examples 1 and 2, as set forth in Table 4 below.

TABLE 4

Filled Non-Asphaltic Coating Formulations.

| Formulation No. | Example 1F, 70% filler content | Example 2F, 70% filler content |
|---|---|---|
| Filler, wt % | Limestone (CaCO$_3$), 70 wt % | Limestone (CaCO$_3$), 70 wt % |
| TOP, wt % | DP-1, 13.2 wt % | DP-8, 13.2 wt % |
| Rosin ester, wt % | P110, 13.2 wt % | P110, 13.2 wt % |
| SBS, wt % | D-1184, 3 wt % | D-1184, 3 wt % |
| SEBS, wt % | G-1650, 0.6 wt % | G-1650, 0.6 wt % |

The resulting filled coating formulation properties are shown in Table 5 below, along with relevant properties of asphalt-based formulations.

TABLE 5

Comparison of Filled Coating Properties.

| Formulation No. | Comparative Example E (blown asphalt coating with 65% filler content) | Comparative Example F (polymer modified asphalt coating with 68% filler content) | Example 1F | Example 2F |
|---|---|---|---|---|
| SP, ° F. | 242 | 249 | 218 | 258 |
| Penetration, dmm at 77° F. | 9 | 15 | 18 | 27 |
| Viscosity, cP at 400° F. | 2418 | 3648 | 9472 | 10610 |

It can be seen that the non-asphaltic coatings according to the present disclosure, i.e., Examples 1F and 2F, have comparable softening points relative to asphaltic coatings and are generally softer (higher penetration values) and more viscous, but are manufacturable using conventional shingle manufacturing equipment.

Figure 2:
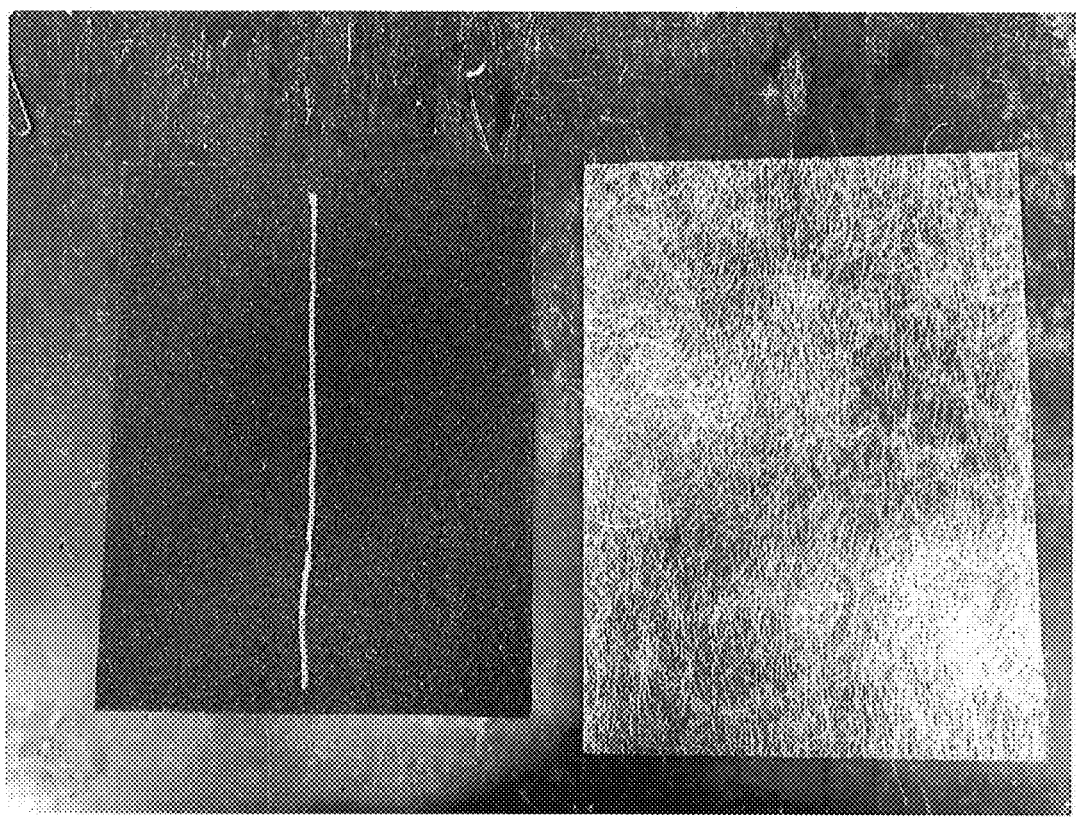

Coupons of the filled formulations of Examples 1F and 2F were prepared for testing as Examples 1C and 2C. The resulting coupons prepared from Example 2F are shown in FIGS. 1 and 2. FIG. 1 shows the front (exposed) sides of the coupons, with a granulated surface for protection against the elements. FIG. 2 shows the back of the coupons, with the left image showing a back side coated with filled coating and surfaced with fines, similar to an asphalt-based shingle, and the right image showing the glass mat without coating. With regard to performance as a roofing shingle, test results are shown in Table 6 below.

TABLE 6

Shingle Coupon Test Results.

| Formulation No. | Comparative Example E | Comparative Example F | Example 1C | Example 2C |
|---|---|---|---|---|
| Tensile, MD (lb-f) | 285 | 229 | 64 | 63 |
| Tensile, CD (lb-f) | 152 | 113 | 36 | 36 |
| Tear, MD (g-f) | 835 | 1363 | 2165 | 1217 |
| Tear, CD (g-f) | 1176 | 1907 | 2374 | 1417 |
| Fastener Pull (lb-f) | 25 | Not tested | 23 | 21 |
| Granule loss (g) | Not tested | Not tested | 0.22 | 0.71 |

These results show that coupons prepared from the non-asphaltic coatings of the present disclosure have lower tensile strengths compared to their asphalt-based analogs, but have comparable or improved tear strengths.

Examples 3-17

Additional non-filled coating formulations were prepared and characterized as set forth in Table 7 below.

TABLE 7

Variations of the Non-Filled Coating Formulations.

| Formulation No. | TOP (wt %) | Rosin Ester (wt %) | Polymer 1 (wt %) | Polymer 2 (wt %) | SP, ° F. | Viscosity, cP at 400° F. | Penetration, dmm at 77° F. |
|---|---|---|---|---|---|---|---|
| Example 3 | Poix de tall oil (44%) | Dertoline P110 (44%) | D-1184 (10%) | G-1650 (2%) | 228 | 1612 | 19 |
| Example 4 | Altapyne pitch (44%) | Dertoline P110 (44%) | D-1184 (10%) | G-1650 (2%) | 215 | 1182 | 36 |
| Example 5 | Sylfat DP-1 (66%) | Sylvacote 7097 (22%) | D-1184 (10%) | G-1650 (2%) | 210 | 295 | 116 |
| Example 6 | Sylfat DP-8 (44%) | Sylvatac RE-98 (44%) | D-1184 (10%) | G-1650 (2%) | 210 | 2205 | 81 |
| Example 7 | Sylfat DP-8 (44%) | Dertoline P110 (44%) | D-1184 (10%) | Elvax 240W (2%) | 235 | 976 | 60 |
| Example 8 | Sylfat DP-8 (45%) | Dertoline P110 (45%) | D-1184 (10%) | — | 237 | 803 | 69 |
| Example 9 | Sylfat DP-8 (44%) | Dertoline P110 (44%) | D-1189 (10%) | G-1650 (2%) | 232 | 790 | 48 |
| Example 10 | Sylfat DP-8 (44%) | Dertoline P110 (44%) | D-1184 (12%) | — | 254 | 1603 | 50 |
| Example 11 | Tufftrek 3100 (44%) | Sylvacote 7097 (44%) | D-1184 (12%) | — | 254 | 624 | 58 |
| Example 12 | Sylfat DP-8 (45%) | WestRez 5110 (45%) | D-1184 (10%) | | 227 | 683 | 51 |
| Example 13 | Sylfat DP-8 (45%) | Sylvacote 4984 (45%) | D-1184 (10%) | | 241 | 421 | 39 |
| Example 14 | Sylfat DP-8 (45%) | Dertoline P105 (45%) | D-1184 (10%) | | 222 | 750 | 56 |
| Example 15 | Sylfat DP-1 (35%) | Sylvatac RE-98 (53%) | D-1184 (10%) | G-1650 (2%) | 180 | 1014 | 61 |
| Example 16 | Sylfat DP-1 (62%) | Sylvacote 7097 (26%) | D-1184 (10%) | G-1650 (2%) | 237 | 345 | 83 |
| Example 17 | Sylfat DP-1 (66%) | Sylvacote 7097 (22%) | D-1184 (10%) | G-1650 (2%) | 210.5 | 295 | 116 |

Corresponding filled coating formulations were prepared according to the present disclosure by adding limestone (calcium carbonate) filler to the non-filled coating formulations of Examples 3-5, 7-9, and 12-14. The resulting filled coating formulation properties are shown in Table 8 below, along with the respective filler contents.

TABLE 8

Physical Properties of the Filled Coatings.

| Formulation No. | Filler content (wt %) | SP, ° F. | Viscosity, cP at 400° F. | Penetration, dmm at 77° F. |
|---|---|---|---|---|
| Example 3F | 65 | 236 | 9892 | 13 |
| Example 4F | 65 | 224 | 7040 | 18 |
| Example 5F | 70 | 245 | 5067 | 48 |
| Example 7F | 70 | 266 | 10430 | 22 |
| Example 8F | 65 | 251 | 5102 | 34 |

TABLE 8-continued

Physical Properties of the Filled Coatings.

| Formulation No. | Filler content (wt %) | SP, °F. | Viscosity, cP at 400° F. | Penetration, dmm at 77° F. |
|---|---|---|---|---|
| Example 9F | 65 | 239 | 3861 | 28 |
| Example 12F | 65 | 226 | 3685 | 25 |
| Example 13F | 65 | 258 | 11800 | 17 |
| Example 14F | 65 | 232 | 4160 | 26 |

Coupons of the filled formulations of Examples 3F-5F, 7F-9F, and 12F-14F were prepared for testing as Examples 3C-5C, 7C-9C, and 12C-14C. Coupons consist of fiberglass mat impregnated with filled coating. Roofing granules are applied to the coupons for the rub loss tests. Otherwise, the coupons are tested without granules applied. With regard to performance as a roofing shingle, test results are shown in Table 9 below.

TABLE 9

Shingle Coupon Test Results.

| Formulation No. | Tensile, MD (lb-f) | Tensile, CD (lb-f) | Tear, MD (g-f) | Tear, CD (g-f) | Nail Pull (lb-f) | Rub loss (g) |
|---|---|---|---|---|---|---|
| Example 3C | 80.1 | not tested | not tested | 1594 | not tested | not tested |
| Example 4C | 69.9 | not tested | not tested | 1720 | not tested | not tested |
| Example 5C | 39.2 | not tested | not tested | 1511 | 12.6 | 2.43 |
| Example 7C | 56.0 | not tested | not tested | 1558 | not tested | not tested |
| Example 8C | 60.0 | not tested | not tested | 1428 | not tested | not tested |
| Example 9C | 57.5 | not tested | not tested | 1328 | not tested | not tested |
| Example 12C | 85.9 | 53.7 | 952 | 1301 | 24.9 | 0.90 |
| Example 13C | 69.5 | 35.0 | 1030 | 1362 | 35.1 | 1.79 |
| Example 14C | 82.4 | 45.4 | 1123 | 1275 | 25.2 | 0.84 |

Examples 18-21

Additional non-filled coating formulations were prepared and characterized as set forth in Table 10 below.

TABLE 10

Variations of the Non-Filled Coating Formulations.

| Formulation No. | Plant-derived continuous phase material (wt %) | Rosin Ester (wt %) | Polymer 1 (wt %) | Polymer 2 (wt %) | SP, °F. | Viscosity, cP at 400 °F. | Penetration, dmm at 77 °F. |
|---|---|---|---|---|---|---|---|
| Example 18 | Cargill Anova 1815 (44.4%) | Sylvacote 7097 (41.6%) | D-1184 (12%) | G-1650 (2%) | 182.2 | 269.7 | 86 |
| Example 19 | Cargill Anova 1815 (44%) | Sylvacote 7097 (42%) | D-1191 (14%) | | 224.3 | 369.1 | 93.5 |
| Example 20 | Cargill low viscosity vegetable oil (29%) | Sylvares 115 (61%) | D-1191 (7%) | Polystyrene from styrofoam (3%) | 162.7 | 337.5 | 23.3 |
| Example 21 | Tufftrek 4002 (35%) | Sylvacote 7097 (53%) | D-1184 (10%) | G-1650 (2%) | 242 | 293 | 76 |

List and Description of Materials Used

| Name | Manufacturer | Description | CAS No. |
|---|---|---|---|
| Dertoline Poix de Tall Oil | Les Derives Resiniques et Terpeniques (DRT) | Tall oil pitch | 8016-81-7 |
| Altapyne Pitch | Ingevity Corporation | Tall oil pitch | 8016-81-7 |
| Sylfat DP1 | Kraton Chemical LLC | Tall oil pitch blend | 8016-81-7 |
| Sylfat DP8 | Kraton Chemical LLC | Tall oil pitch blend; low sterols | none |

| Name | Manufacturer | Description | CAS No. |
|---|---|---|---|
| Anova 1815 | Cargill | Corn oil | |
| 187-1740 low viscosity modifier | Cargill | Low viscosity vegetable oil | |
| D-1184 | Kraton Polymers | Branched SBS block copolymer, 30% styrene | 9003-55-8 |
| D-1189 | Kraton Polymers | Radial SBS block copolymer, 32% styrene | 9003-55-8 |
| G-1650 | Kraton Polymers | Linear SEBS block copolymer, 29% styrene | 66070-58-4 |
| Elvax 240W | Dow | ethylene-vinyl acetate copolymer, 28% vinyl acetate | 24937-78-8 |
| Dertoline P110 | Les Derives Resiniques et Terpeniques (DRT) | Esters of maleated rosin with pentaerythritol | 94581-17-6 |
| Sylvatac RE-98 | Kraton Chemical LLC | Resin acids and rosin acids, esters with pentaerythritol | 8050-26-8 |
| Sylvacote 7097 | Kraton Chemical LLC | Rosin, maleated, polymer with glycerol | 68038-41-5 |
| Tufftrek 3100 | Georgia Pacific Chemicals | Crude tall oil | |
| Tufftrek 4002 | Georgia Pacific | Renewable oil technology (based on triglycerides) | |
| WestRez 5110 | Ingevity Corporation | Modified rosin ester | proprietary |
| Dertoline P105 | Les Derives Resiniques et Terpeniques (DRT) | pentaerythritol ester of rosin | 8050-26-8 |
| Sylvacote 4984 | Kraton Chemical LLC | Rosin, maleated, polymer with glycerol | 68038-41-5 |
| D-1191 | Kraton Polymers | Radial SBS Polystyrene from Styrofoam | 9003-55-8 |

Although the disclosure has been described in certain specific exemplary embodiments, many additional modifications and variations would be apparent to those skilled in the art in light of this disclosure. It is, therefore, to be understood that this disclosure may be practiced otherwise than as specifically described. Thus, the exemplary embodiments of the disclosure should be considered in all respects to be illustrative and not restrictive, and the scope of the disclosure to be determined by any claims supportable by this disclosure and the equivalents thereof, rather than by the foregoing description.

We claim:

1. A non-asphaltic roofing shingle comprising a substrate having a coating which comprises a crude tall oil-based continuous phase material, a resinous hardening agent, a polymer, and a filler,
    wherein the softening point of the coating ranges from 175-320° F., and
    wherein the penetration of the coating ranges from 5-100 dmm measured at 77° F.

2. The non-asphaltic roofing shingle according to claim 1, wherein the substrate comprises a fiberglass mat, a polyester mat, a scrim, a coated scrim, or a combination thereof.

3. The non-asphaltic roofing shingle according to claim 1, wherein the non-asphaltic roofing shingle is a single layer shingle or a laminated shingle having two or more layers.

4. The non-asphaltic roofing shingle according to claim 1, wherein a thickness of the coating on the substrate ranges from 5-100 mils.

5. The non-asphaltic roofing shingle according to claim 1, wherein the non-asphaltic roofing shingle comprises one or more layers of the coating.

6. The non-asphaltic roofing shingle according to claim 1, wherein the non-asphaltic roofing shingle further comprises granules.

* * * * *